US012370471B2

(12) United States Patent
Wahlgren

(10) Patent No.: US 12,370,471 B2
(45) Date of Patent: Jul. 29, 2025

(54) SLURRY REMOVAL SYSTEM

(71) Applicant: Eddy Pump Corporation, El Cajon, CA (US)

(72) Inventor: Daniel Wahlgren, Escondido, CA (US)

(73) Assignee: Eddy Pump Corporation

( * ) Notice: Subject to any disclaimer, the term of this patent is extended or adjusted under 35 U.S.C. 154(b) by 978 days.

(21) Appl. No.: 17/318,317

(22) Filed: May 12, 2021

(65) Prior Publication Data

US 2022/0362688 A1 Nov. 17, 2022

(51) Int. Cl.
*B01D 21/24* (2006.01)
*B01F 25/50* (2022.01)

(52) U.S. Cl.
CPC ..... *B01D 21/2477* (2013.01); *B01D 21/2472* (2013.01); *B01F 25/50* (2022.01)

(58) Field of Classification Search
CPC ............ B01F 13/1055; B01F 15/00194; B01F 15/0022; B01F 15/00227; B01F 15/00285; B01F 15/02; B01F 15/0201; B01F 15/0202; B01F 15/0203; B01F 15/0445; B01F 2215/0045; B01F 3/0861; B01F 3/088; B01F 3/1214; B01F 3/1221; B01F 3/2261; B01F 5/10; B01F 7/00633; B01F 33/84; B01F 23/45; B01F 23/49; B01F 23/511; B01F 23/53; B01F 23/808; B01F 25/50; B01F 27/191; B01F 35/2117; B01F 35/2132; B01F 35/2133; B01F 35/2202; B01F 35/71; B01F 35/711; B01F 35/712; B01F 2101/27; B01F 35/881; B01F 25/10; B01F 25/51; B01F 35/21111; B01F 23/09; B01F 2025/913; B01F 2025/916; B01F 25/00; B01F 35/2134; B01F 35/90; B01F 35/181; B01F 35/2211; B01F 35/832; B01F 2035/99; B01F 2101/2204; B24B 57/00; B24B 57/02; C09G 1/02; B01D 37/00;

(Continued)

(56) References Cited

U.S. PATENT DOCUMENTS 3,276,695 A * 10/1966 Giardino ................. B05B 15/68
366/291
3,416,320 A * 12/1968 Asher ..................... B01F 23/41
516/197

(Continued)

OTHER PUBLICATIONS

International Search Report and Written Opinion issued May 23, 2022 in corresponding International Application No. PCT/US22/18184.

*Primary Examiner* — Charles Cooley
(74) *Attorney, Agent, or Firm* — Global IP Counselors, LLP

(57) ABSTRACT

A slurry removal system includes a tank, an eddy pump, and a pipe system. The tank is configured to receive a mixture of solid material and liquid. The eddy pump has a pump inlet connected to the tank and a pump outlet. The pipe system is connected to the pump outlet and including a discharge line and a recirculation line. The eddy pump is configured to pump the mixture of solid material and liquid from the tank through the pump inlet to the recirculation line to form an essentially homogeneous mixture, and configured to pump the essentially homogeneous mixture from the tank through the pump inlet to the discharge line to remove the homogeneous mixture from the tank.

20 Claims, 21 Drawing Sheets

(58) Field of Classification Search
CPC .............. B01D 37/043; B01D 21/2477; B01D 21/2472; B01D 21/30; B65B 3/00; C09K 3/1409; C09K 3/1463
USPC ........... 366/177.1–182.4, 144–149, 136–137
See application file for complete search history.

(56) References Cited

U.S. PATENT DOCUMENTS

| | | | | | |
|---|---|---|---|---|---|
| 3,830,473 | A * | 8/1974 | Lieferman | C08B 30/16 | 366/136 |
| 4,045,004 | A * | 8/1977 | Berger | B01F 35/713 | 366/175.2 |
| 4,130,134 | A * | 12/1978 | Castle | E04G 21/04 | 222/527 |
| 4,447,157 | A * | 5/1984 | Underwood | E21B 21/062 | 366/173.2 |
| 5,046,856 | A * | 9/1991 | McIntire | B01F 25/421 | 366/291 |
| 5,052,486 | A * | 10/1991 | Wilson | C09K 8/64 | 166/308.4 |
| 5,522,660 | A * | 6/1996 | O'Dougherty | B01F 25/51 | 366/136 |
| 5,590,960 | A * | 1/1997 | Clinton | B01F 33/80 | 366/136 |
| 5,662,807 | A * | 9/1997 | Angelle | E21B 41/005 | 210/744 |
| 6,096,228 | A * | 8/2000 | Angelle | B01D 21/06 | 210/527 |
| 6,106,733 | A | 8/2000 | Wood | | |
| 6,494,608 | B1 * | 12/2002 | Retamal | B01F 35/82 | 366/132 |
| 6,568,842 | B1 * | 5/2003 | Murray | C04B 2/08 | 422/162 |
| 8,899,823 | B2 * | 12/2014 | Oldham | B01F 25/60 | 366/136 |
| 10,501,357 | B1 * | 12/2019 | McKinney | B01D 21/02 | |
| 2008/0230491 | A1 * | 9/2008 | Wick | B03B 9/02 | 210/512.1 |
| 2008/0283295 | A1 | 11/2008 | Eia | | |
| 2010/0176033 | A1 | 7/2010 | Rapp | | |
| 2010/0224256 | A1 * | 9/2010 | Tseng | G01F 11/28 | 137/565.29 |
| 2013/0019954 | A1 * | 1/2013 | Tseng | G01F 11/28 | 137/1 |
| 2013/0150268 | A1 * | 6/2013 | Oldham | C09K 8/62 | 422/162 |
| 2018/0080295 | A1 * | 3/2018 | Newman | E21B 21/066 | |
| 2018/0104622 | A1 * | 4/2018 | Dawson | B01D 21/0015 | |
| 2020/0101403 | A1 * | 4/2020 | Bollom | B01D 21/2488 | |
| 2020/0408052 | A1 | 12/2020 | Shamblin et al. | | |
| 2022/0250012 | A1 * | 8/2022 | Webb | B01F 35/71731 | |
| 2022/0362688 | A1 * | 11/2022 | Wahlgren | B01D 21/2477 | |
| 2023/0110920 | A1 * | 4/2023 | Jones | B01F 27/112 | 366/279 |
| 2023/0159666 | A1 * | 5/2023 | Karppi | B01F 23/53 | 162/175 |
| 2025/0059840 | A1 * | 2/2025 | Turner | B01D 21/2461 | |

* cited by examiner

SLURRY REMOVAL SYSTEM

BACKGROUND

Field of the Invention

The present invention relates to a slurry removal system. In particular, the present invention relates to a slurry removal system that uses an eddy pump to homogenize a mixture of liquid and solid material.

Background of the Invention

In conventional drilling, drill cuttings that are generated post drilling operations, which are pumped up and out through the center of the drill. The drill cuttings can include shavings, soil bits, under-earth mud and soil deposits etc. These cuttings need to be treated before being moved elsewhere, because they are mixed with fluids like diesel fuel and mud drilling fluid.

SUMMARY

It has been found that excavator size makes it difficult to scoop the cuttings out of a tank without disturbing other assemblies and structures, since the tank generally forms a tight work area. Thus it is an expensive, inefficient, and hazardous procedure using excavators. Further, the excavators process is cumbersome and takes significant time with many excavator trips, in order to empty the tank.

In view of the state of the known technology, one aspect of the present disclosure is to provide a slurry removal system that includes a tank, an eddy pump and a pipe system. The tank is configured to receive a mixture of solid material and liquid. The eddy pump has a pump inlet connected to the tank and a pump outlet. The pipe system is connected to the pump outlet and including a discharge line and a recirculation line. The eddy pump is configured to pump the mixture of solid material and liquid from the tank through the pump inlet to the recirculation line to form an essentially homogeneous mixture, and configured to pump the essentially homogeneous mixture from the tank through the pump inlet to the discharge line to remove the homogeneous mixture from the tank.

Another aspect of the present disclosure is to provide a method of removing slurry. The method comprises depositing a mixture of solid material and liquid into a tank, and pumping the mixture of solid material and liquid with an eddy pump having a pump inlet connected to the tank and a pump outlet through a pipe system connected to the pump outlet and including a discharge line and a recirculation line. The eddy pump pumps the mixture of solid material and liquid from the tank through the pump inlet to the recirculation line to form an essentially homogeneous mixture when the recirculation line is in an open state, and pumps the essentially homogeneous mixture from the tank through the pump inlet to the discharge line to remove the homogeneous mixture from the tank when the discharge line is in an open state.

BRIEF DESCRIPTION OF THE DRAWINGS

The invention will be explained in more detail hereinafter with reference to the drawings.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
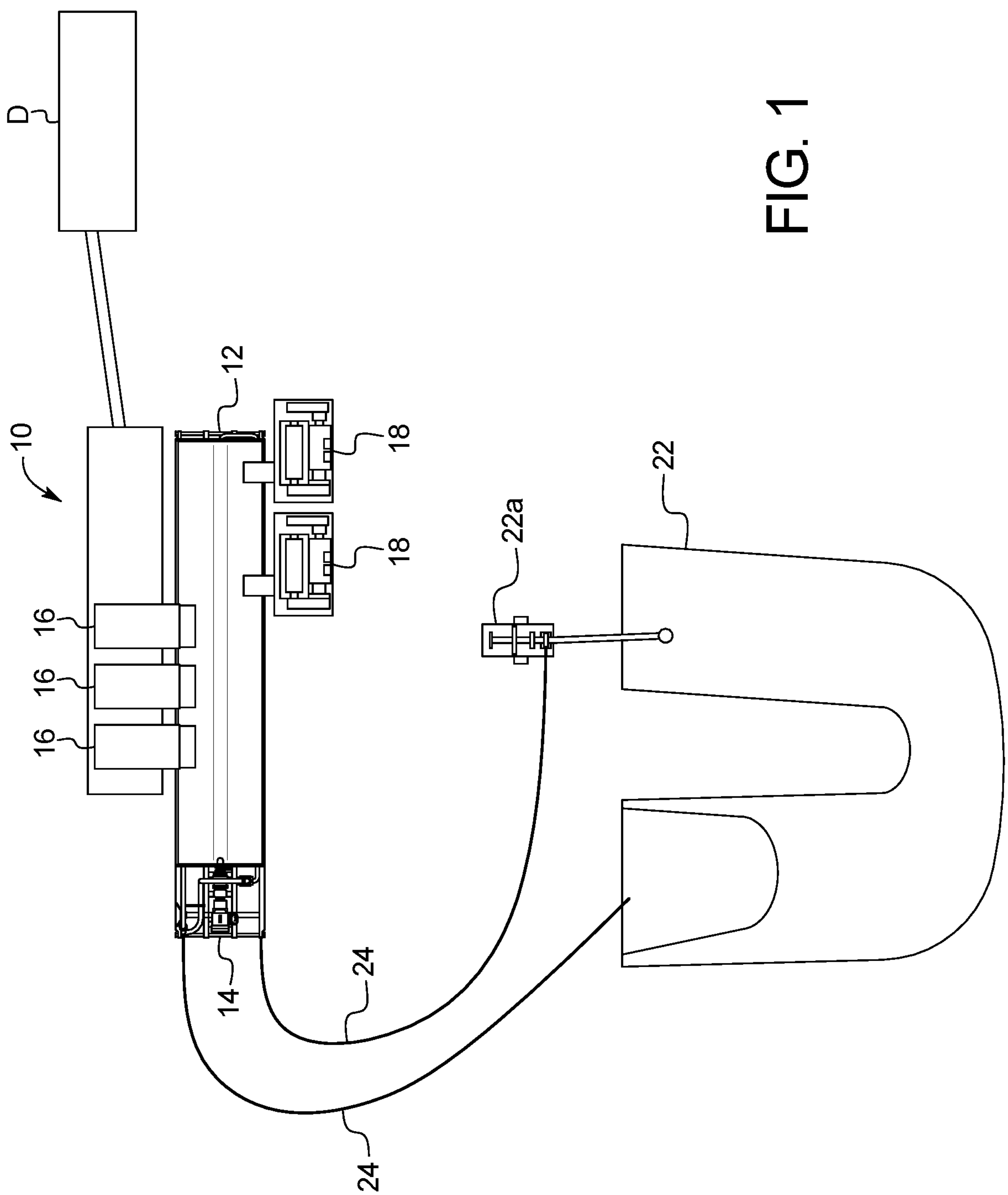
FIG. 1 illustrates a schematic layout of a slurry removal system according an embodiment of the present invention.

Referring initially to FIG. 1, a slurry removal system 10 is illustrated in accordance with an embodiment. In this embodiment, the slurry removal system 10 includes a tank 12, a pump 14, a plurality of shakers 16, a plurality of centrifuges 18, a plurality of water jet guns 20 (FIG. 9), a reserve pit 22 and a pipe system 24 connecting these elements. During a drilling operation with a drill D, the drill cuttings C that are generated post drilling operations, are pumped up and out through the center of the drill D. This drill cuttings C can include shavings, soil bits, under-earth mud and soil deposits etc. These cuttings need to be treated before being moved elsewhere, because they are mixed with fluids like diesel fuel and mud drilling fluid. As discussed in more retail herein, once the drilling operation begins, the drill D will start drilling and the cuttings C will start falling into the tank 12 via the shakers 16 that deposit the material into piles along the length of the tank 12. The cuttings C can be broken or dispersed using the water jet guns 20 and/or the centrifuges 18. The cuttings C can then intermix with the liquid in the tank 12 to form a homogenous mixture. This intermixing is performed with the eddy pump 14 described herein in a recirculation mode, such that the tank 12 will essentially be a homogenous mixture of cuttings C and liquid to form a slurry that can be discharged through a boom arm 26 into waiting trucks or pumped to the reserve pit 22 (e.g., a settling pond). Thus, as can be understood, the embodiments described herein achieve homogeneity and the proper consistency of a slurry, by controlling the amount of liquid that is mixed into the solids.

As shown in FIGS. 2-5, the tank 12 is a generally rectangular tank made from metal and has a first end 28, a second end 30 opposite the first end 28, a bottom 32 and a top 34. The top 34 can have an opening 36 so as to be open or at least partially open to easily receive solid materials (e.g., cuttings C) therethrough and into the interior 38 of the tank 12. In one embodiment, the tank 12 is about four (4) feet high or deep, about forty (40) feet in length, and eight and half (8.5) feet width. Moreover, the tank 12 can include an eight (8) foot pump deck 40 on which the eddy pump 14 can be mounted. However, it is noted that the tank 12 dimensions are merely exemplary, and the tank 12 can be any suitable size and/or configuration and formed from any suitable material or combination of materials.

The pump 14 can be an eddy pump, for example, as described in U.S. patent application Ser. No. 16/176,495, filed Oct. 31, 2018 and entitled Eddy Pump, the entire contents of which are herein incorporated by reference.

Figure 6:
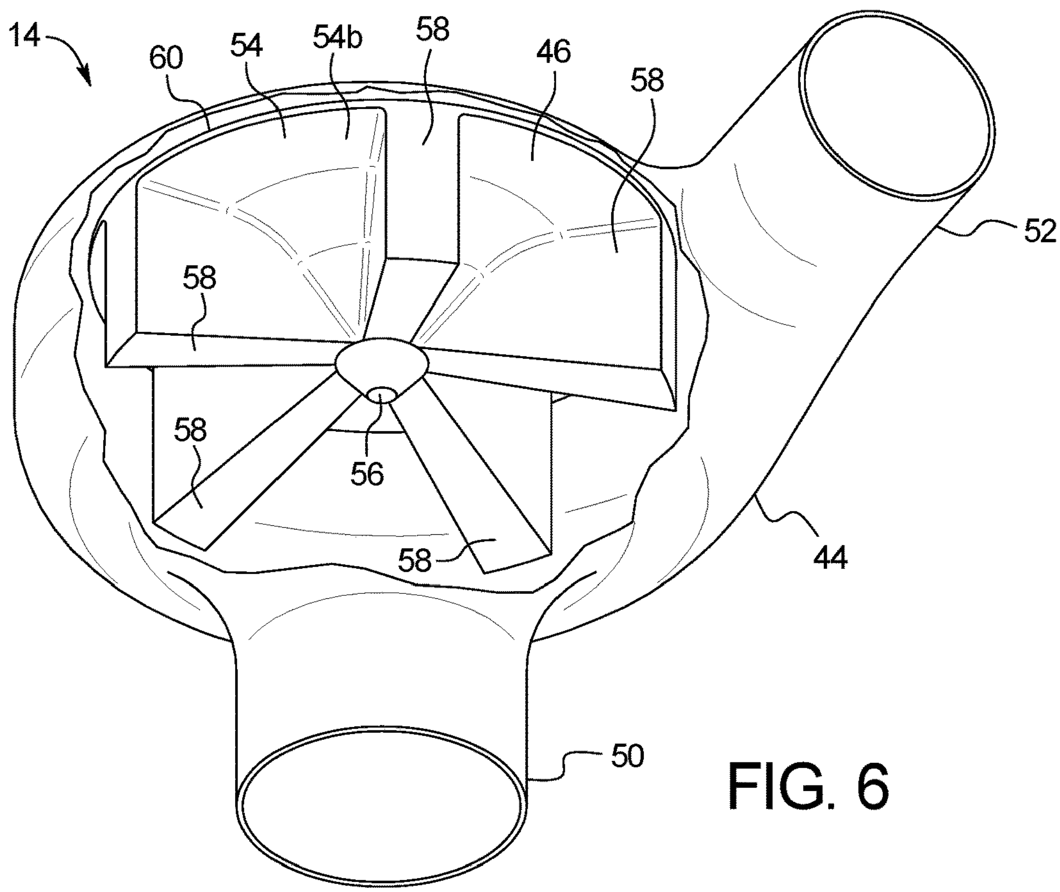
FIG. 6 is a bottom perspective view in section illustrating one embodiment of an eddy pump.
Figure 7:
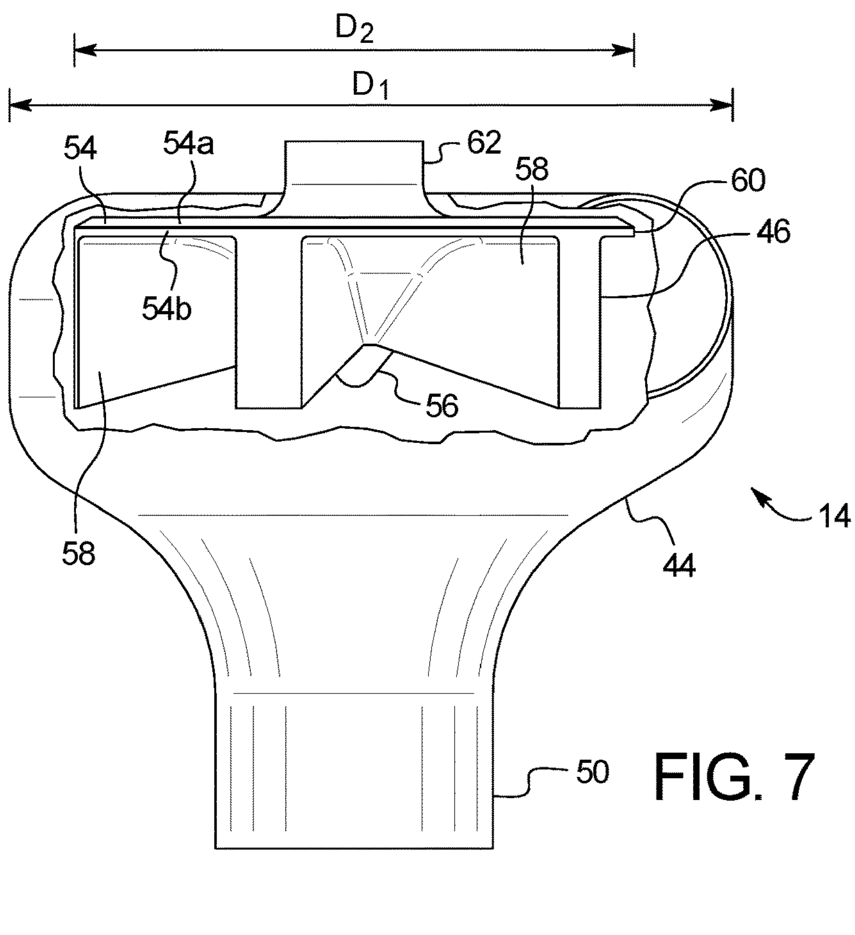
FIG. 7 is a side view in section illustrating the embodiment of an eddy pump of FIG. 6.
Figure 8:
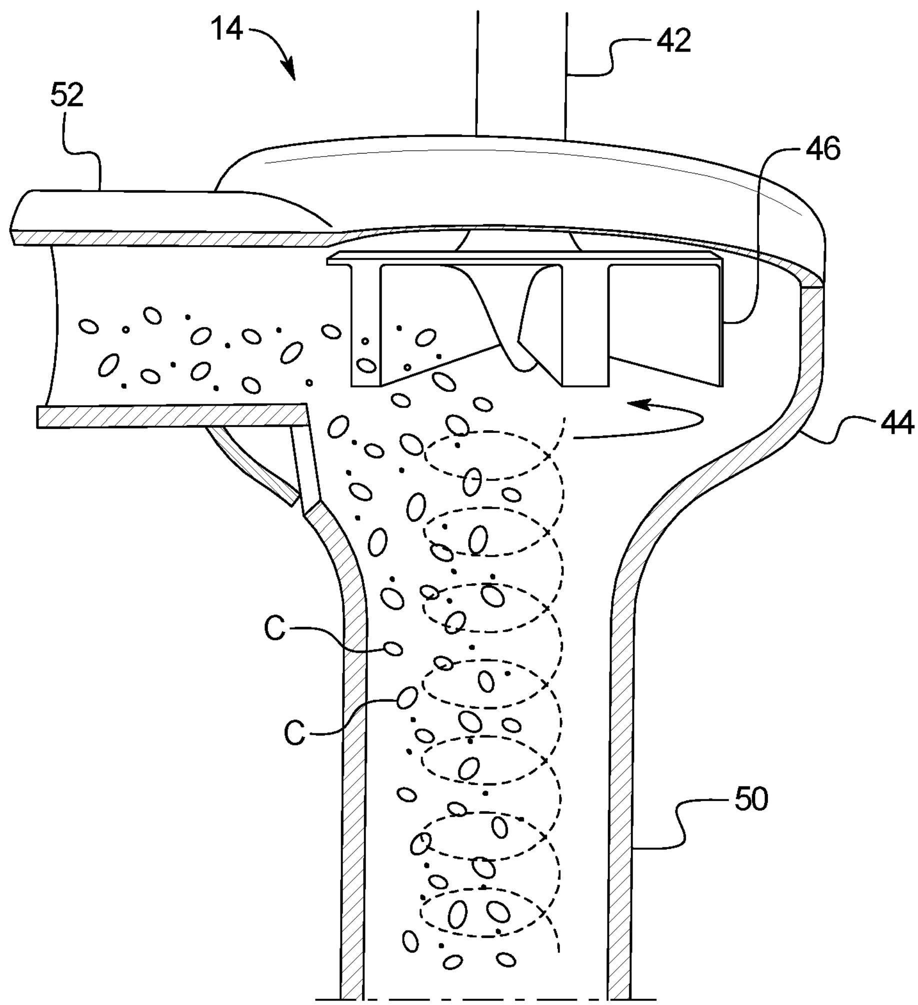
FIG. 8 is another side view in section illustrating the embodiment of an eddy pump of FIG. 6 in operation.

As discussed, the pump 14 can be disposed on the pump deck 40 and is in communication with the tank 12. As shown in FIGS. 6-8, the eddy pump 14 includes a drive motor 42, a volute or housing 44 and a rotor 46. The rotor 46 is disposed within the housing 44 such that fluid, liquids, materials, and slurries can enter the housing 44 and be pumped by the rotor 46. The rotor 46 is connected to the drive motor 42 (FIG. 8) that is configured to drive or rotate the rotor 46 to pump fluid, liquids, materials, and slurries from the inlet to the discharge. The motor 42 can be any suitable motor know in the art that would be capable of driving the rotor 46 at suitable rotational velocities.

As shown in FIGS. 6-8, the housing 44 is curved and includes an inlet 50 and a discharge or outlet 52. The inner surface of the housing 44 is generally cylindrical and has a diameter $D_1$ that is larger than the diameter $D_2$ of the rotor 46. The inlet 50 is disposed along a radial axis of the rotor 46 on the bottom of the housing 44, which enables the fluid or materials to be sucked or drawn into the housing 44 based on the rotation of the rotor 46. The outlet 52 is disposed 90 degrees offset from the inlet 50 (i.e., in a direction tangential to the rotor 46), which enables the fluid or materials to be pumped out of the housing 44.

The rotor 46 includes a back plate 54, a conical center portion (hub) 56 and a plurality of blades 58. The rotor 46 can be cast, molded, forged, machined, or formed in any suitable manner. Thus, the back plate 54, the conical center portion 56 and the plurality of blades 58 can be formed as a unitary one-piece member. The rotor 46 can be an alloy, steel, stainless steel, aluminum, zinc, bronze, rubber, plastic or any other suitable material or combination of materials. Moreover, it is noted that the rotor 46 can be any suitable mater or design. Thus, while the rotor 46 is preferable a unitary one-piece member, the rotor 46 can be formed from in multiple steps or by multiple pieces that are assembled in any suitable manner.

In one embodiment, the back plate 54 is a generally circular plate having a first side (defining a first planar surface) 54*a*, a second side (defining a second planar surface) 54*b* and an outer circumferential edge 60. The first or upper side 54*a* faces the interior of the housing 44 and has a protrusion or shaft 63 extending therefrom. The protrusion 62 is connected to or connectable to a drive shaft from the drive motor 42. The second side 54*b* has the plurality of blades 58 disposed thereon. As shown in FIG. 7, the back plate 54 extends form the center of the rotor 46 about the same length as the rotor 46, and thus covers the entire rotor blade length. In other words, the plurality of blades 58 defines a radial diameter, and the back plate 54 has a diameter that is the same as or about the same as the radial diameter of the back plate 54. However, it is noted that the radial diameter of the back plate 54 can be between 0.3 and 1.0 the radial diameter defined by the plurality of blades 58, depending on the particle size, or any other parameter. This configuration (i.e., a "full size" back plate) prevents fluid from escaping the rotor 46 and facilitates pushing the fluid circumferentially towards the outlet 52 of the rotor 46 and discharge. Moreover, the back plate 54 helps reduce recirculation by maintaining fluid distribution inside the volume of the rotor 46, and prevents leakage and energy losses between the rotor 46 and upper side of the housing 44. The back plate 54 also helps reduce static pressure loss, which contributes to higher pressure differential and head developed by the rotor 46.

As shown in FIGS. 6 and 7, the conical center portion 56 is a cone disposed in the center of the rotor 46 and facilitates fixing the rotor 46 to the motor shaft 62. The conical center portion 56 is disposed on the second side 54*b* of the back plate 54 and is opposite to the protrusion 62. The conical center portion 56 has a vertex and a base. The base is adjacent the back plate 54 and tapers toward the conical vertex. The base radially extends about 50 percent of the base plate. The conical vertex of the hub forms an angle of about 40 degrees. However, the size of the base of the conical center portion 56 and the angle formed by the conical vertex can be any suitable or desired size or angle.

The conical center portion 56 helps hydraulically by causing suction which enables the fluid to flow inside the housing 44 smoothly from the inlet 50 and facilitates laminar movement towards the outlet or end of the rotor 46 and subsequently to the discharge. This induction of laminar flow aids in reduction of eddy currents and recirculation inside the housing 44, increasing pump efficiency. The size of the conical center portion 56 (length, diameter, and angle) can depend on the particle size, allowing better clearances of the particles, as long as laminar flow can be maintained towards the discharge. The conical center portion 56 also helps create better eddy current from the suction to the inlet 50 of the rotor 46 while preventing turbulence at higher flow rates than the best efficiency point allowing the pump 14 a flow rate 140% of the design best efficiency point. The size of the cone can be reduced or increased to control power consumption.

As shown in FIGS. 6 and 7, the plurality of blades 58 extends from the conical center portion 56 and is disposed on the second side 54*b* of the back plate 54. In this embodiment, the plurality of blades 58 includes five (5) blades, but the plurality of blades 58 can be any suitable number of blades that form a suitable eddy current. Each of the blades includes a first side, a second side, an end, and a bottom surface. Each of the blades 58 extends radially outwardly from the conical center portion 56 and along a longitudinal direction from the back plate 54. Moreover, since the conical center portion 56 is a cone having a sloping surface, each of the blades 58 follows the sloping contour of the conical center portion 56, see FIG. 7 for example.

The first longitudinal side and a second longitudinal side of the blades 58 are opposite each other. The first and second longitudinal sides extend in the longitudinal direction, generally parallel to the longitudinal axis of the rotor 46 and taper away from each other in the radial direction. That is, as shown in FIGS. 6 and 7, the first and second longitudinal sides are disposed about 1.5 inches apart adjacent the conical center portion 56 and 2 inches apart adjacent the circumferential edge of the back plate 54. Accordingly, as can be understood, the first and second longitudinal sides separate about 0.5 inches in the radial direction. It is noted that the first and second longitudinal sides can separate in any manner desired or can be parallel, if desired. Moreover, if the size of the rotor 46 is changed, the change in separation of the first and second longitudinal sides can be changed accordingly. That is, in the embodiment, the change in the separation of the first and second longitudinal sides is about 33 percent. In other words, the separation between the first and second longitudinal sides at the peripheral edge of the back plate 54 is about 33 percent larger than the separation of the first and second longitudinal sides adjacent the conical center portion 56.

In one embodiment, each of the blades 58 tapers upwardly from the peripheral edge of the back plate 54 to the conical center portion 56. The bottom surface of each blade 58 extends from a first end to a second end. The first end is adjacent the conical center portion 56 and the second end is adjacent to the outer surface. The second end preferably is higher than the first end when measured from the second side 54*b* of the back plate 54. For example, in one embodiment, the first end is approximately 3.17 inches from the back plate and the second end is 5 inches from the back plate. However, it is noted that the first and second ends can be any suitable distance from the back plate. Moreover, if the size of the rotor 46 is changed the change in heights of the first and second longitudinal ends can change accordingly. That is, in this embodiment the difference in the heights of the first and second ends is about 58 percent. In other words, the height of the second end is 58 percent higher than the height of the first end.

The outer surface of the blades 58 can be seen in at least FIGS. 6 and 7. The outer surface is preferably a rectangular and is essentially parallel with a rotational axis of the rotor 46. As shown specifically in FIG. 7, the outer surface forms a right angle (90 degrees) with the back plate 54. Moreover, the outer surface extends generally parallel with the inner surface of the housing 44 and is spaced a prescribed distance therefrom. Such a configuration enables particles to be disposed between the outer surface and the inner surface of the housing 44.

Additionally, the bottom surface of the blades 58 forms an angle of 75 degrees with the outer surface and an angle of about 15 degrees with a line parallel to the second side 54*b* of the back plate 54. This tapering results in the conical center portion 56 having a height from the second side 54*b* of the back plate 54 that is greater than the height of the first end and less than the height of the second end. Thus, in one embodiment, the conical center portion 56 has a height of 4.27 inches. Thus, as can be understood, the height of the conical center portion 56 is about 83 percent of the height of the second end and about 38 percent greater than the height of the first end. However, the height of the conical center portion 56 can be any suitable height.

Thus, as can be understood, the height of each of the blades 58 increases from the center of the rotor 46 towards the outside diameter or the peripheral edge of the back plate 54, on the suction side of the rotor 46. This structure enhances the eddy currents for improved suction of fluid and creates clearance for larger particle sizes. The rotor blade height at outside diameter is kept close to the height of the discharge or the diameter of the discharge so as to be capable of pushing fluids directly into the discharge. This configuration reduces leakage, recirculation, and pressure losses. The tapering blade height also helps reduce the torque, and thus reduce the power consumed versus uniform blade height from center to outer diameter. The outer blade height can also be varied in proportion to the outlet diameter of the housing 44, keeping the dimensions similar if desired.

As shown in FIG. 7, each of the blades 58 is spaced a predetermined distance from the housing 44. Generally, the clearance between the blades and the housing 44 is kept at an additional 10-15% of the maximum particle size that is estimated to be in the material. This enables the rotor 46 to pass particles of significant size while reducing the wear of the blades in the rotor 46.

A rotor having five blades is the preferable number of blades to reduce eddy current formation and recirculation between the rotor blades. It has been found that too few blades can cause turbulence and may not enable higher flow rates to create the required pressure differential. Too many blades may reduce clearances prohibiting larger size particles from passing through the pump 14 and may reduce fluid volume allowable for ideal flow rate. However, the rotor 46 can have any suitable number of blades that will enable some flow with a suitable amount and size of particles to pass through the housing 44.

Embodiments described herein reduce Net Positive Suction Head (NPSH) because the embodiments can handle lower suction pressures and subsequent cavitation significantly better due to smoother streamlines relative the conventional systems. This improves the suction performance of the pump 14 and reduces the chances of cavitation and pump damage.

As can be understood, embodiments of the pumps described herein do not rely on the centrifugal principle of conventional pumps. Instead of a low tolerance impeller of a conventional pump, the pumps described herein use a specific geometric, recessed rotor 46 to create a vortex of fluid or slurry like that of a tornado. That is, the Eddy Pump 14 operates on the tornado principle. The tornado formed by the Eddy Pump 14 and the rotor 46 generates a very strong, synchronized central column of flow from the pump rotor to the pump inlet 50 and creates a low-pressure reverse eddy flow from the pump inlet 50 to the pump discharge. This action also results in an area of negative pressure near the pump seal. The negative pressure allows the pump 14 to achieve zero leakage.

Further open rotor design described herein has high tolerances that enable any substance that enters the intake to be passed through the discharge without issues. This translates to a significant amount of solids and debris that passes through without clogging the pump 14. In one embodiment, the pump 14 is capable of pumping up to 70% solids by weight and/or slurries with high viscosity and high specific gravity.

The configuration of the rotor 46 so as to be recessed also creates eddy current that keeps abrasive material away from critical pump components. This structure improves pump life and reduces pump wear.

The tolerance between the rotor 46 and the housing 44 easily allows the passage of a large objects significantly greater than that of a centrifugal pump. For example, in a 2-inch to 10-inch Eddy Pump 14 the tolerance ranges from 1-9 inches. Thus, this type of pump is preferably for pumping the solid materials from the drilling operation.

The embodiments described herein can have additional advantages, such as low maintenance, minimal downtime, low ownership costs and no need for steel high-pressure pipeline.

Since the Eddy Pump 14 is based on the principle of Tornado Motion of liquid as a synchronized swirling column along the center of intake pipe that induces agitated mixing of solid particles with liquid, suction strong enough for solid particles to travel upwards into the housing or volute 44 and generating pressure differential for desired discharge is created. This eddy current is formed by the pressure differential caused by the rotor 46 and strengthened by turbulent flow patterns in the housing or volute 44 and suction tube. Eddy currents are strengthened by the presence of solid particles which increase the inertial forces in the fluid. The formation of the eddy depends on the suspended solid particles that causes suction. Unlike conventional vortex pumps, the rotor 46 directly drives the fluid through the pump 14 with no slip. The Eddy Pump 14 uses the movement of particles and the wake induced from these solid particles to generate Eddy Current and induce suction. Hence, efficiency is 7-10% better than conventional vortex pumps, with respect to horsepower. The eddy current generated by the Eddy Pump 14 ensures steady movement of the mixture that leads to excellent non-clumping capabilities and the power to pump a very high concentration of solids, up to 70% by weight, and highly viscous fluids.

FIG. 1 illustrates the shakers 16. As can be understood, the shakers 16 can be any suitable shaker used for drilling, mining, etc. As described above, during a drilling operation cuttings C are deposited into the tank 12. The cuttings C can be deposited using the plurality of shakers 16. In one embodiment, as shown in FIG. 1, three shakers 16 are positioned over the opening 36 in the tank 12. As is understood in the art, the shakers 16 separate larger cuttings and can deposit the cutting in the tank 12. That is, in one embodiment, the drilling cuttings and fluid flows over meshed screens which are sized to separate the desired range of cuttings sizes from the fluid. Due to the rheological properties of the fluid, an acceleration is applied to the screen via a vibratory motion to facilitate high rates of fluid flow and cuttings removal. The upward motion of the shaker screen forces fluid downward through the shaker openings and moves solids upward. When the screen moves on the downward stroke, solids do not follow the screen. They are, instead, propelled along the plane of the shaker screen where they are discarded into the tank 12.

Figure 9:
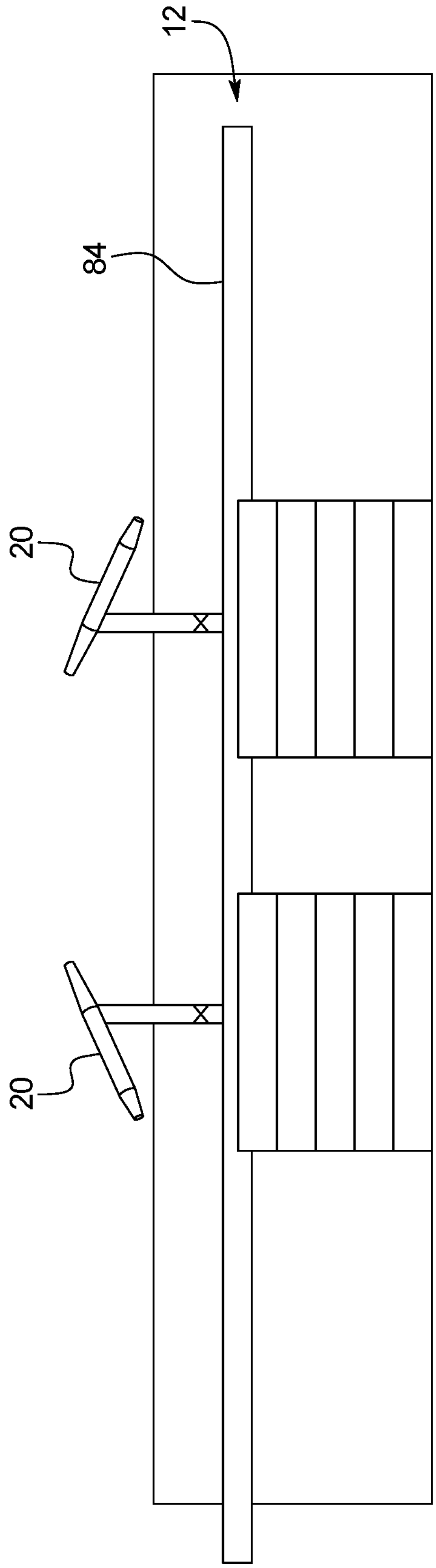
FIG. 9 is a schematic view of the tank of FIG. 2 with water guns to break up the solid material.

As shown in FIG. 9, the water jet guns 20 can be positioned adjacent the opening 36 in the tank 12. The water jet guns 20 are configured to cut materials using a very high-pressure jet of water, or a mixture of water and an abrasive substance. The water jet guns 20 can receive high pressure water from the pump **22*a* that pumps the water from the reserve pit 22**.

Figure 10:
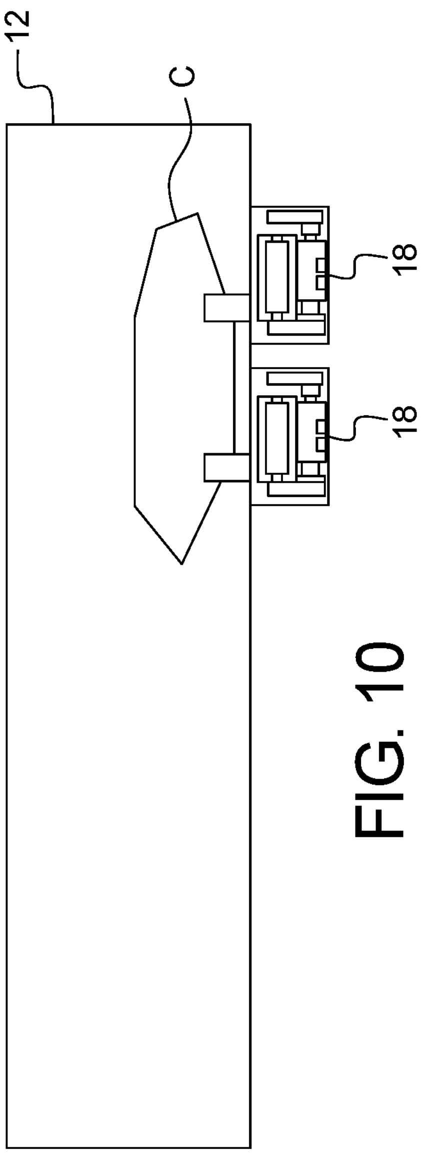
FIG. 10 is a schematic view of the tank of FIG. 2 with a centrifuge to facilitate mixing of the slurry.
Figure 11:
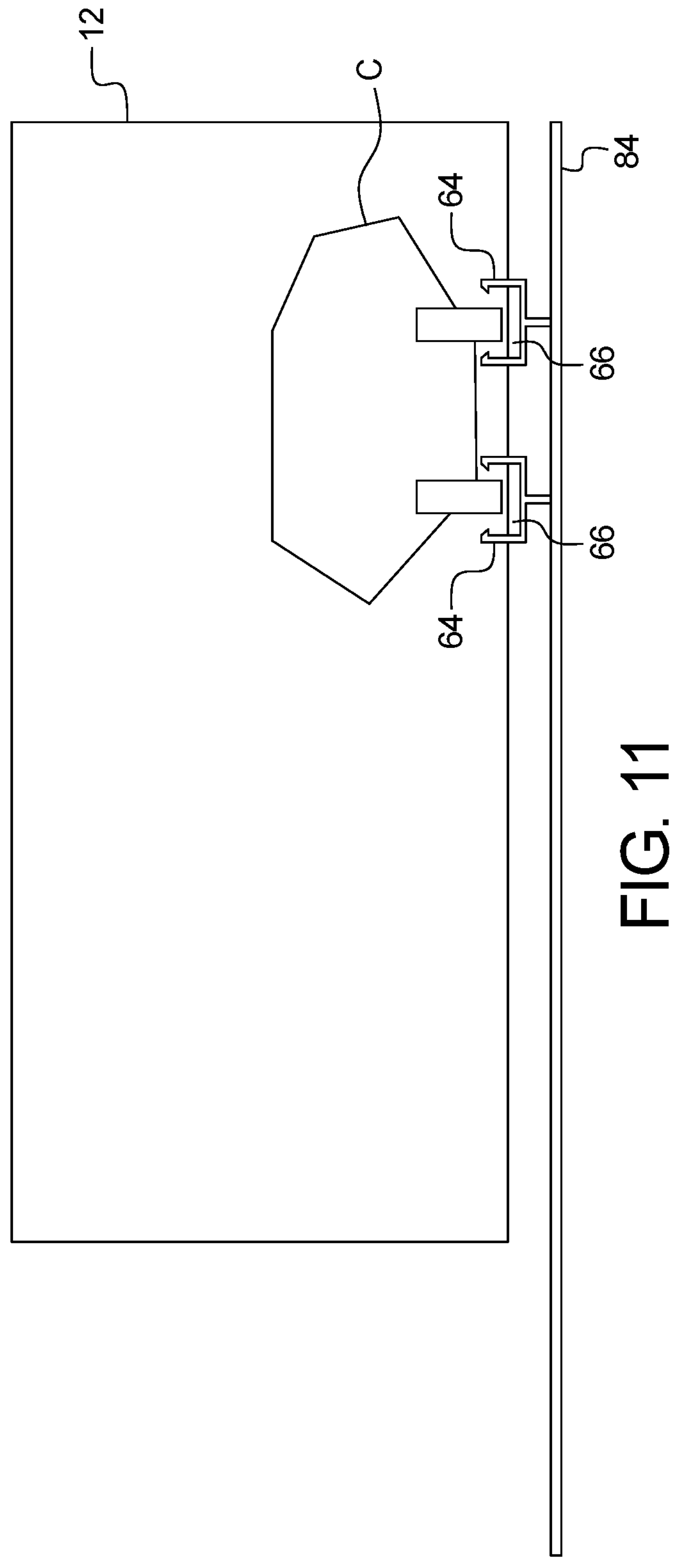
FIG. 11 is a schematic view of the tank of FIG. 10 illustrating the jets for the centrifuge.

As shown in the schematic illustration in FIGS. 10 and 11 centrifuges 18 can include jets 64 for the centrifuge troughs 66 and valves (that can be manual or automatic) (not shown) that enable the jets 64 to operate. The jets 64 are positioned and arranged to employ a high rotational speed to separate cuttings C and liquid. That is, the centrifuges 18 are capable of separating solid materials from liquids in the slurry. As can be understood, the cuttings C and the liquid are pumped into the centrifuge 18 through an inlet. Feed goes into a horizontal bowl, which rotates. The bowl is composed of a cylindrical part and a conical part. The separation takes place in the cylindrical part of the bowl. The fast rotation generates centrifugal forces up to 4000×g. Under these forces, the solid particles with higher density are collected and compacted on the wall of the bowl. A scroll (also screw or screw conveyor) rotates inside the bowl at a slightly different speed. This speed difference is called the differential speed. This way the scroll is transporting the settled particles along the cylindrical part of the bowl and up to the end conical part of the bowl. At the smallest end of the conical part of the bowl, the dewatered solids leave the bowl via discharge opening.

Taken individually, the shakers 16, centrifuge 18 and water jet guns 20 are conventional components that are well known in the art. Since individually, the shakers 16, centrifuge 18 and water jet guns 20 are well known in the art, these structures will not be discussed or illustrated in further detail herein. Rather, it will be apparent to those skilled in the art from this disclosure that the components can be any type of structure that can be used to carry out the present invention.

Figure 12:
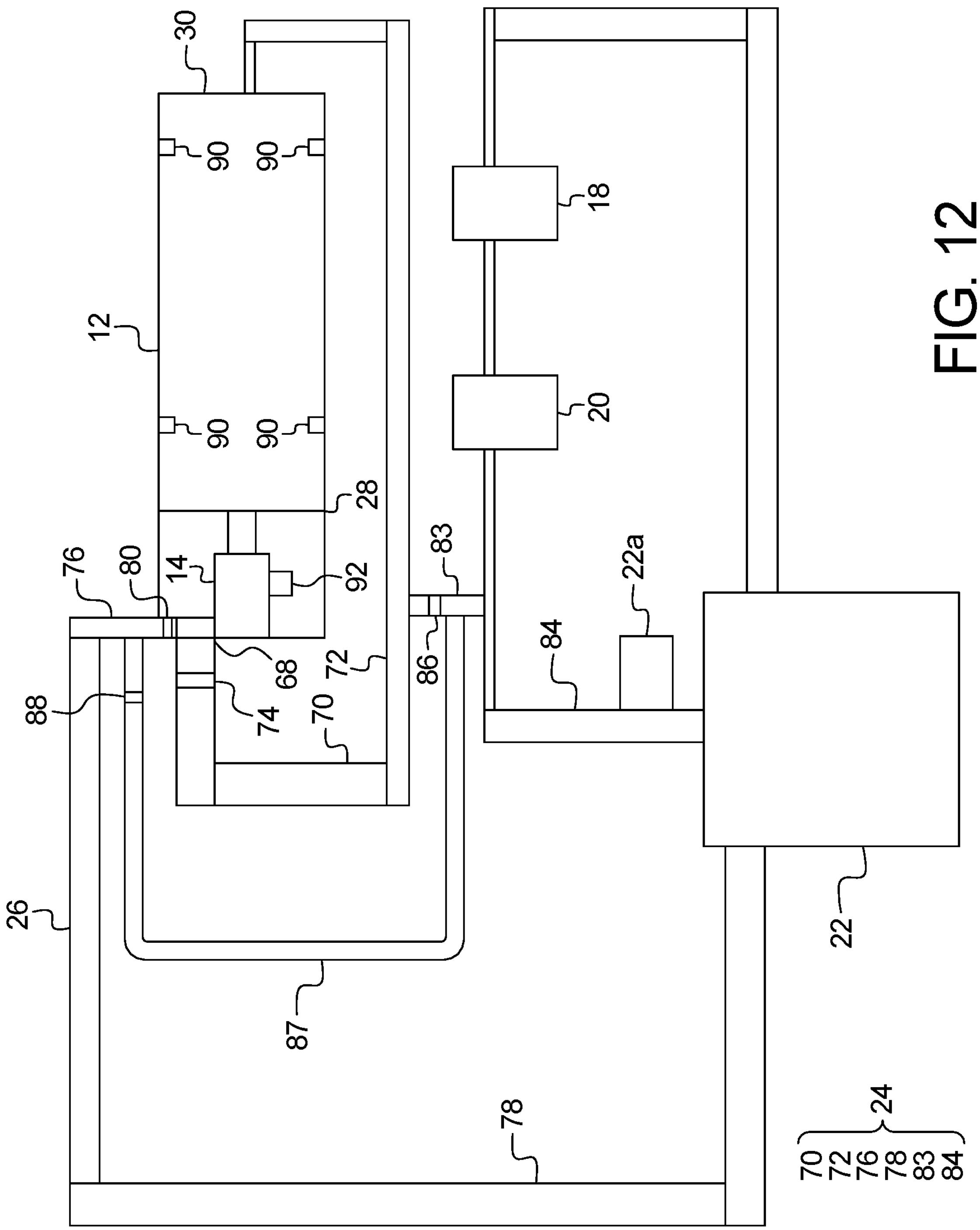
FIG. 12 is a schematic illustration of the pipe system connecting the elements of the slurry removal system of FIG. 1.

As shown in FIG. 12, the pipe system 24 couples the tank 12, pump 14, centrifuge 18 and water jet guns 20 and the reserve pit 22. The outlet of the tank 12 is connected to the inlet 50 of the pump 14. The pump outlet has a V coupling 68 and/or two pipes that extend therefrom. The first pipe 70 from the V coupling is attached to the recirculation line 72 and has a first valve 74. The second pipe 76 is attached to the boom arm 26 and/or the piping 78 from the reserve pit 22 and has a second valve 80. The recirculation line 72 can be a third pipe and can be a flush line for the slurry.

Thus, as illustrated in FIGS. 2-5, the second line 76 can be connected to the boom arm 26. The boom arm 26 can be used to control the material disposal via truck. A hydraulic jack 82 (see FIGS. 2 and 4) can used to raise or lower the discharge boom arm 26 into a truck. This unloading boom can swivel in any direction to make it easier for a trailer to position itself. The entire tank 12 is also able to skid on and off for easy loading on a truck or on a tractor trailer making it a mobile tank.

Additionally, the boom arm 26 can couple to a pipe the leads the reserve pit (see FIG. 11). The reserve pit 22 enables the tank 12 to be empty and the slurry to be stored in a location away from the tank 12.

Figure 2:
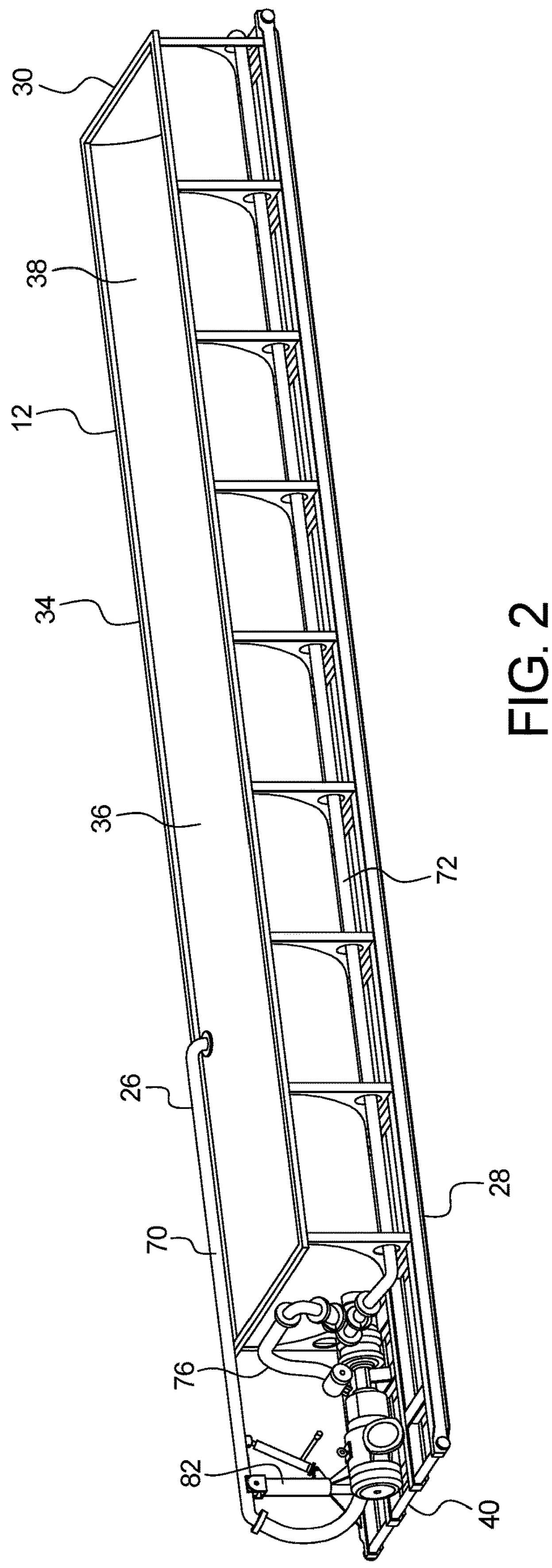
FIG. 2 is a top perspective view of a tank for a slurry with the eddy pump and pipe system for the slurry removal system illustrated in FIG. 1.
Figure 3:
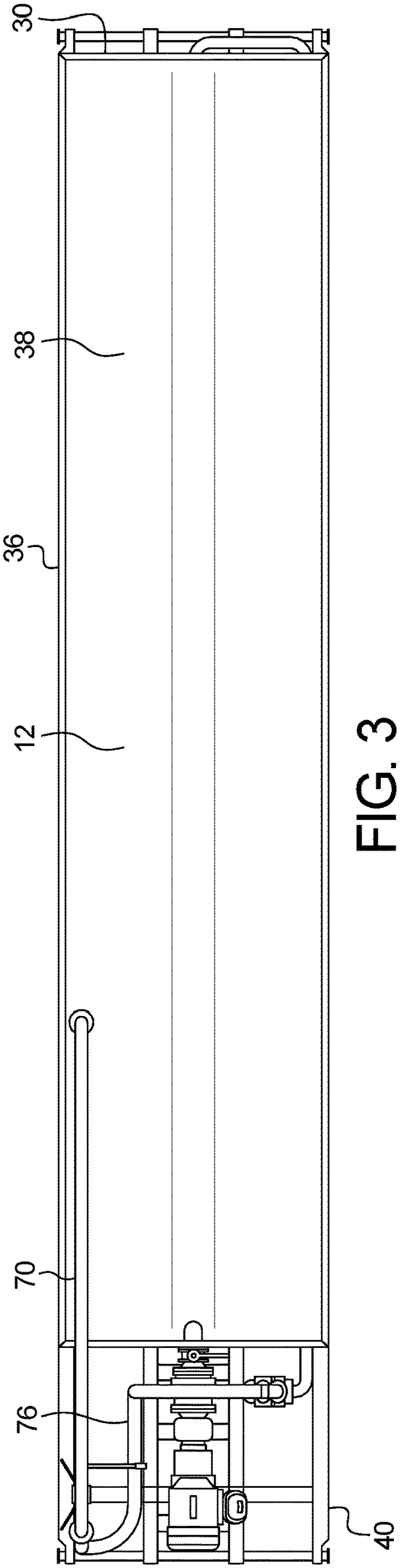
FIG. 3 is a top view of the tank and eddy pump of FIG. 2.
Figure 4:
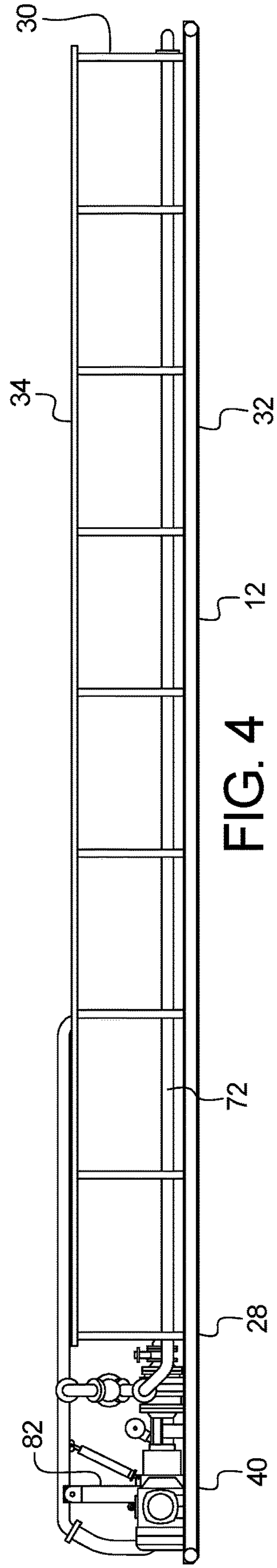
FIG. 4 is a side view of the tank and eddy pump of FIG. 2.
Figure 5:
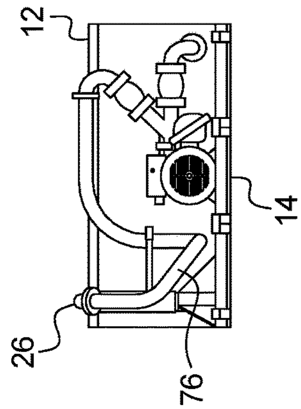
FIG. 5 is an end view of the tank and eddy pump of FIG. 2.

As shown in FIGS. 2, 4 and 12, the recirculation line 72 extends adjacent the tank 12 and enters the tank 12 at the bottom of the second end 30 of the tank 12. The slurry in the recirculation line is at high pressure and thus is capable of pushing the slurry back towards the outlet to the pump 14 at the first end of the tank 12. Further since the recirculation line 72 causes the slurry to be moved through the length of the tank 12, it facilitates creation of a uniform and/or homogeneous mixture in the tank 12.

A connecting line 83 is disposed between the pressurized line 84 from the reserve pit 22 and the recirculation line 72. A valve 86 can be disposed in the connecting line 83. The pressurized line 84 from the reserve pit 22 is at a high pressure and can operate the water jet guns 20 and the centrifuge 18 as described herein. A flush line 86 for the slurry extends from the second pipe 76 to the connecting pipe 83. Thus, as can be understood, in one embodiment the pipe system 24 includes first pipe 70, recirculation line 72, second pipe 76, piping 78, connecting line 83, pressurized line 84, flush line 87 and any valves, connectors, lines or other pipes and/or structures necessary or desired.

As can be understood, during a drilling operation, solid material and fluid are formed. The solid material and fluid pass through the shakers 16 and then the solid material can be deposited in the tank 12. Some fluid can also be deposited in the tank 12 and/or fluid can already be disposed in the tank 12. The water jet guns 20 and the centrifuges 18 can be employed to break up the solid material and/or separate the materials. As discussed herein, the reserve pit pump 22*a* and the flush line 87 can be operated at this time to pressurize the flush line 87 and operate the water jet guns 20 and the centrifuge 18.

Figure 13:
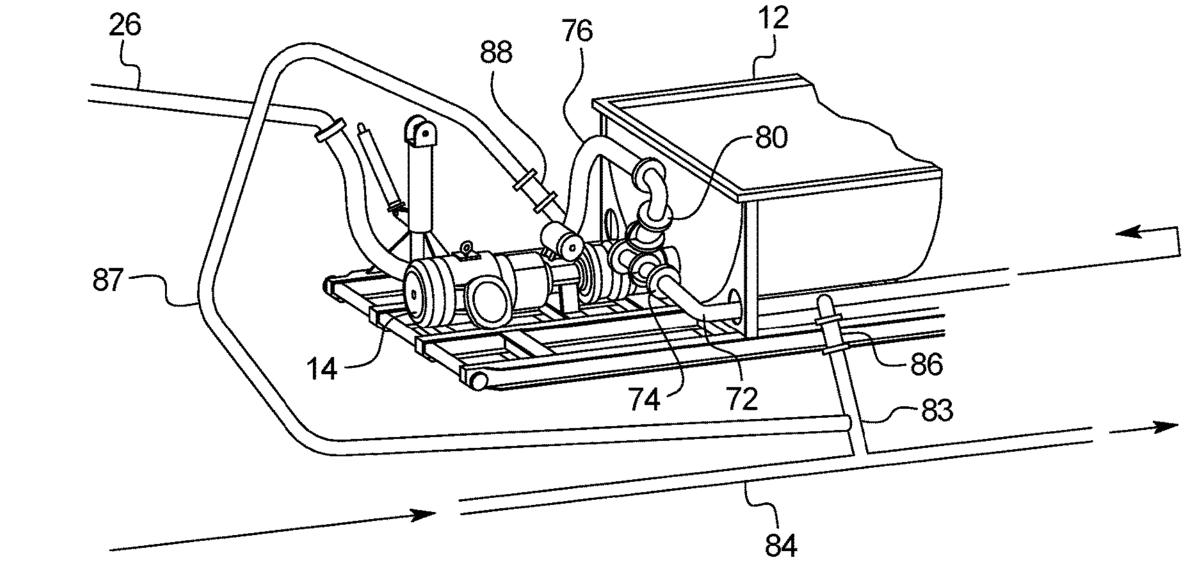
FIG. 13 is enlarged perspective end view of the tank and eddy pump of FIG. 2, in which the pipe system is configured to enable the solid water and fluid to be recirculated back to the tank.
Figure 14:
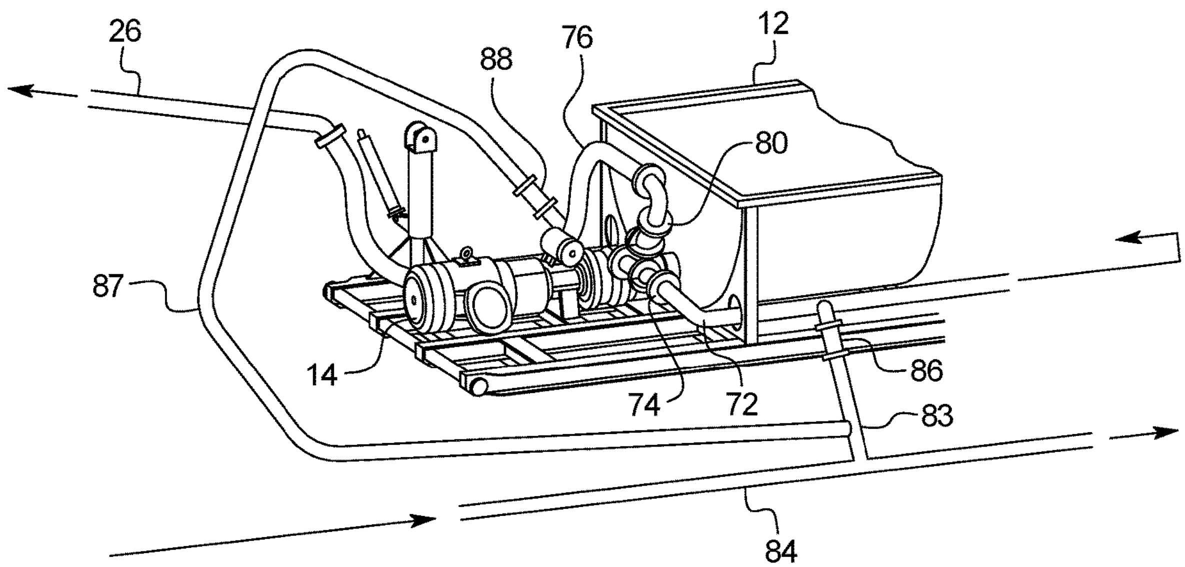
FIG. 14 is enlarged perspective end view of the tank and eddy pump of FIG. 2, in which the pipe system is configured to disposed to the slurry.
Figure 15:
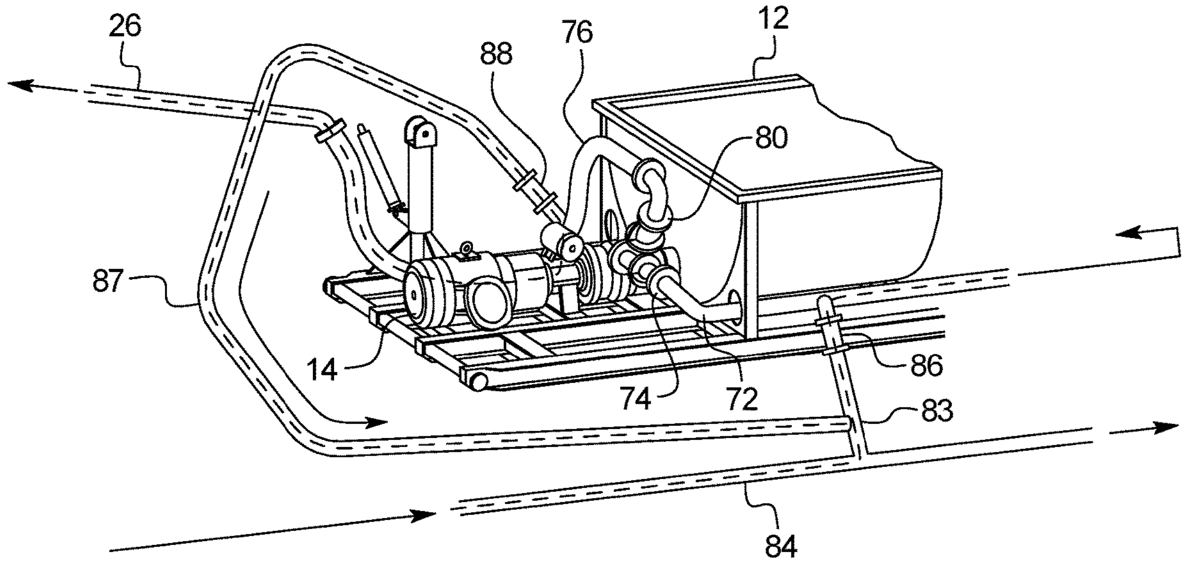
FIG. 15 is enlarged perspective end view of the tank and eddy pump of FIG. 2, in which the pipe system is configured to flush the disposal line.
Figure 16:
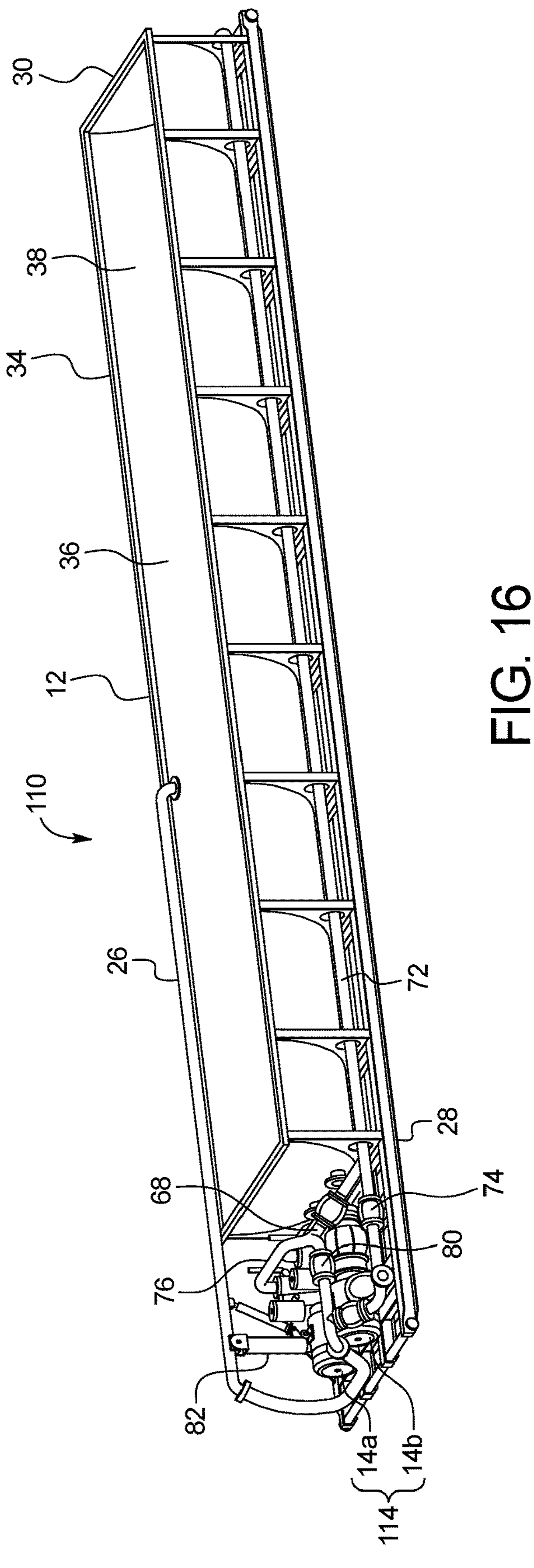
FIG. 16 is a top perspective view of a second embodiment of tank for a slurry with two eddy pumps and pipe system for the slurry removal system illustrated in FIG. 1.

When the cuttings reach a 2 foot level in the tank 12 the pump 14 can be activated. As shown in FIGS. 13-15, the valves 80, 86 and 88 are closed and the valve 74 is opened. The cuttings C in the tank 12 are thus recirculated through the recirculation line 72 and back into the tank 12 so as to be homogenized to create a consistent slurry. The water jet guns 20 can be operated manually (or automatically) to break up stacked solids as needed or desired.

Once the slurry in the tank 12 reaches a 3 foot level, the valve 80 can be opened and the valve 74 can be closed. The slurry is pumped from the tank 12 to the reserve pit 22 until the tank 12 is empty. At this time, the valve 86 can be opened and flush water can be added to clean the recirculation line 72 and aid in the slurry cuttings for ease of pumping to the reserve pit 22. This process can be performed for about 15 seconds or any other suitable time.

After this process is completed, the valve 86 can be closed. When the tank 12 is empty, the valve 74 opens and the valve 80 closes. The valve 88 is also opened and water can be flushed down the flush line 87 for about one minute (or any other suitable time) to ensure the line 87 is flushed and the solid material is cleaned. The tank 12 can then be reloaded the process repeated.

It is noted that while many of the steps described herein can be performed manually, the process can also the automatic. That is, the described system 10 can include sensors 90 that detect the level of material in the tank 12 and a computer control system 92 that opens and closes the valves at the proper timing and levels. Moreover, any portion or portions of the system 10 described herein can be manual and/or automated and/or a combination thereof.

In other words, the system 10 can include an computer control system or electronic controller 92 that controls and operates the entire system 10 automatically. As can be understood, in such a system 10, the electronic controller 92 preferably includes a microcomputer with a control program that controls the pumps 14, valves 74, 80, 86, 88 and boom arm 26 as discussed above. The electronic controller 92 can also include other conventional components such as an input interface circuit, an output interface circuit, a graphical user interface (GUI) and storage devices such as a ROM (Read Only Memory) device and a RAM (Random Access Memory) device. The microcomputer of the electronic controller 92 is programmed to control the pumps 14, valves 74, 80, 86, 88 and boom arm 26. The electronic controller 92 is operatively coupled to the pumps 14, valves 74, 80, 86, 88 and boom arm 26 in a conventional manner. The internal RAM of the electronic controller 92 stores statuses of operational flags and various control data. The electronic controller 92 is capable of selectively controlling any of the components of the system 10 in accordance with the control program. It will be apparent to those skilled in the art from this disclosure that the precise structure and algorithms for the electronic controller 92 can be any combination of hardware and software that will carry out the functions of the present invention.

Second Embodiment

Referring now to FIGS. 16-20, a slurry removal system 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In this embodiment, the slurry removal system 110 includes a pump system 114 that includes a plurality of eddy pumps 14 (e.g., first eddy pump 14*a* and second eddy pump 14*b*). As can be understood, the pumps can work in combination or separately alone. As shown in FIGS. 16-19 the first eddy pump 14*a* and second eddy pump 14*b* are connecting at the output and form prior to the V coupling 68.

Figure 17:
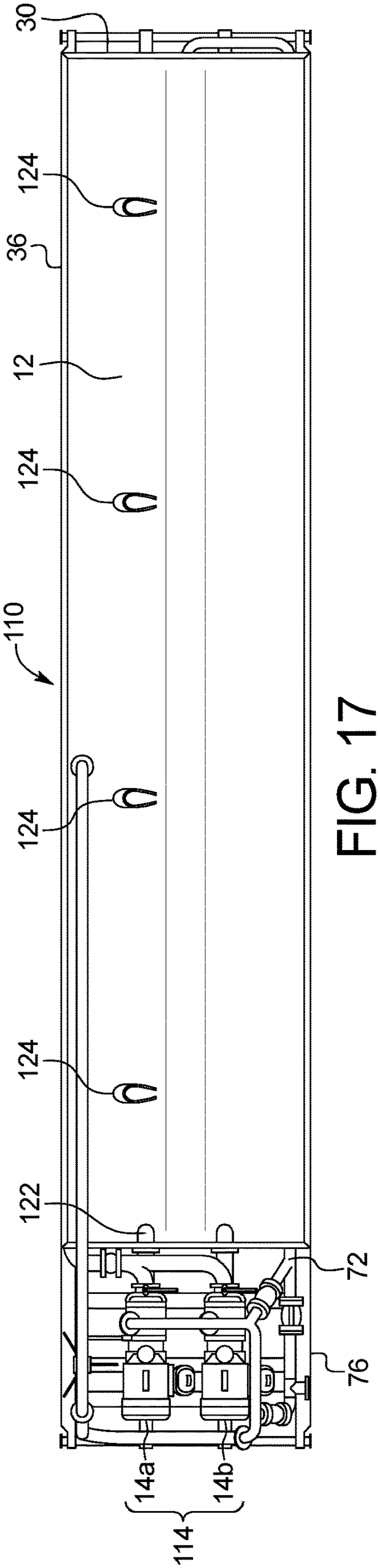
FIG. 17 is a top view of the tank and eddy pumps of FIG. 15.
Figure 18:
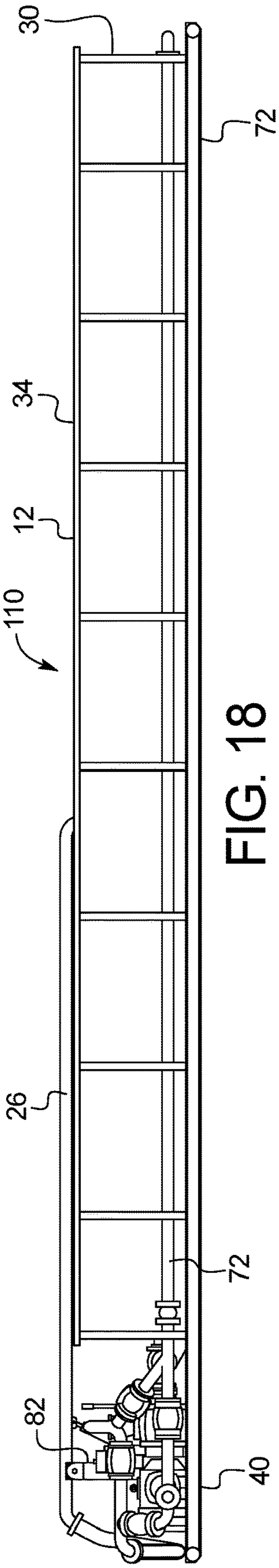
FIG. 18 is a side view of the tank and eddy pumps of FIG. 15.
Figure 19:
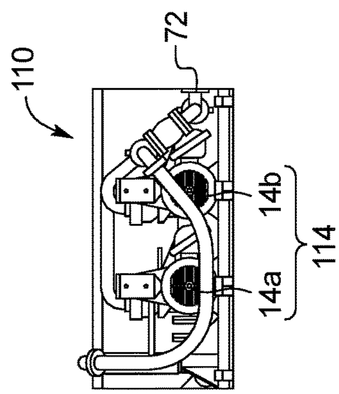
FIG. 19 is another top perspective view of the tank and eddy pumps of FIG. 15.
Figure 20:
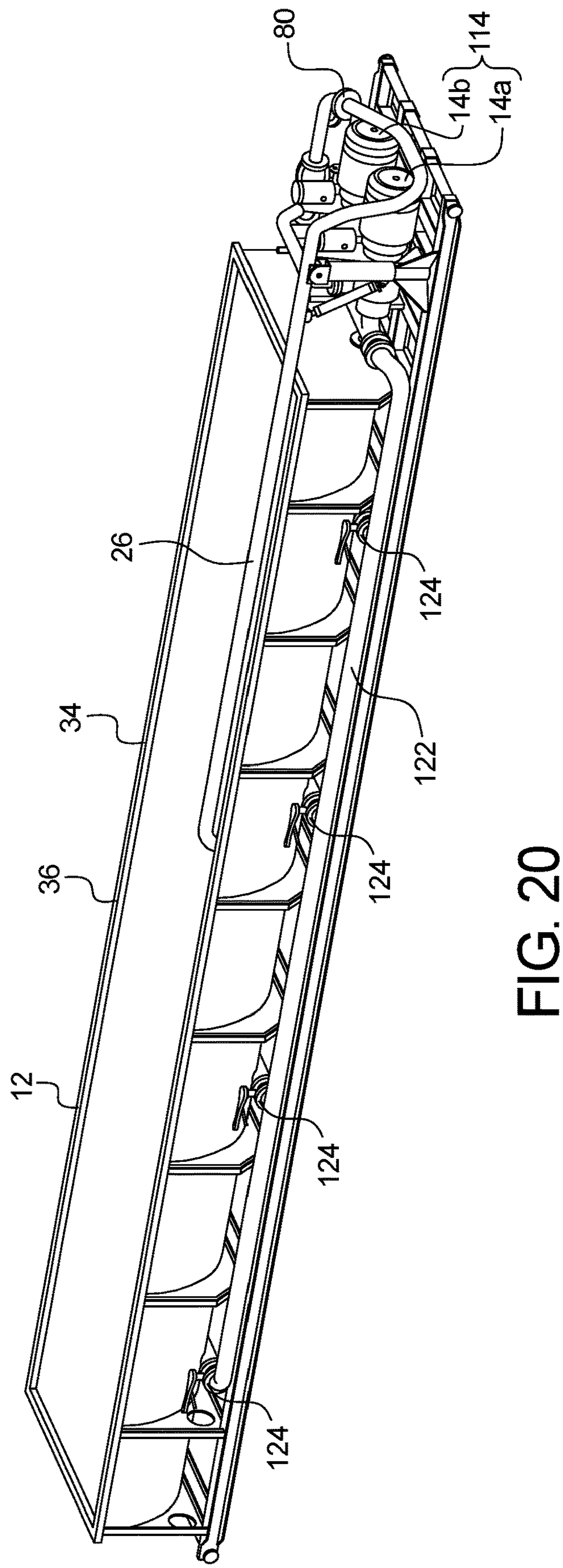
FIG. 20 is an end view of the tank and eddy pumps of FIG. 15.

Additionally, as shown in FIGS. 17 and 20, the system 110 can include a suction system that include a suction line 122 and suction valves 124. As can be understood, the suction line 122 can be coupled to the inlets 50 of the pumps 14*a* and 14*b*. There are multiple pump suction valves 124 (e.g., 4) on one side of the tank 12, where the suction valve 124 located closest to the highest concentration of material can be opened, and the rest of the suction valves 124 are closed during the operation. This allows the pump to access the highest concentrations of cuttings C and move them into the lower concentrated areas of the tank to accelerate the mixing process. This helps the pump system 114 maintain a consistent slurry rather than just having the liquid being recirculated or suctioned away. This mechanism helps recirculate the mixture through the mixing loop as well. It is noted that while the suction system is illustrated in this embodiment, the suction system can be employed in any embodiments disclosed herein.

Moreover, the suction system can be in communication with the electronic controller 92 discussed herein and the valves 124 can be automatically or manually operated, as desired.

Third Embodiment

Referring now to FIGS. 21-30, a slurry removal system 210 in accordance with a third embodiment will now be explained. In view of the similarity between the first, second and third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity.

In this embodiment, the slurry removal system 210 includes a pump system 214 that includes a plurality of eddy pumps 14 (e.g., first eddy pump 14*a* and second eddy pump 14*b*). As can be understood, the pumps can work in combination or separately alone.

Figure 21:
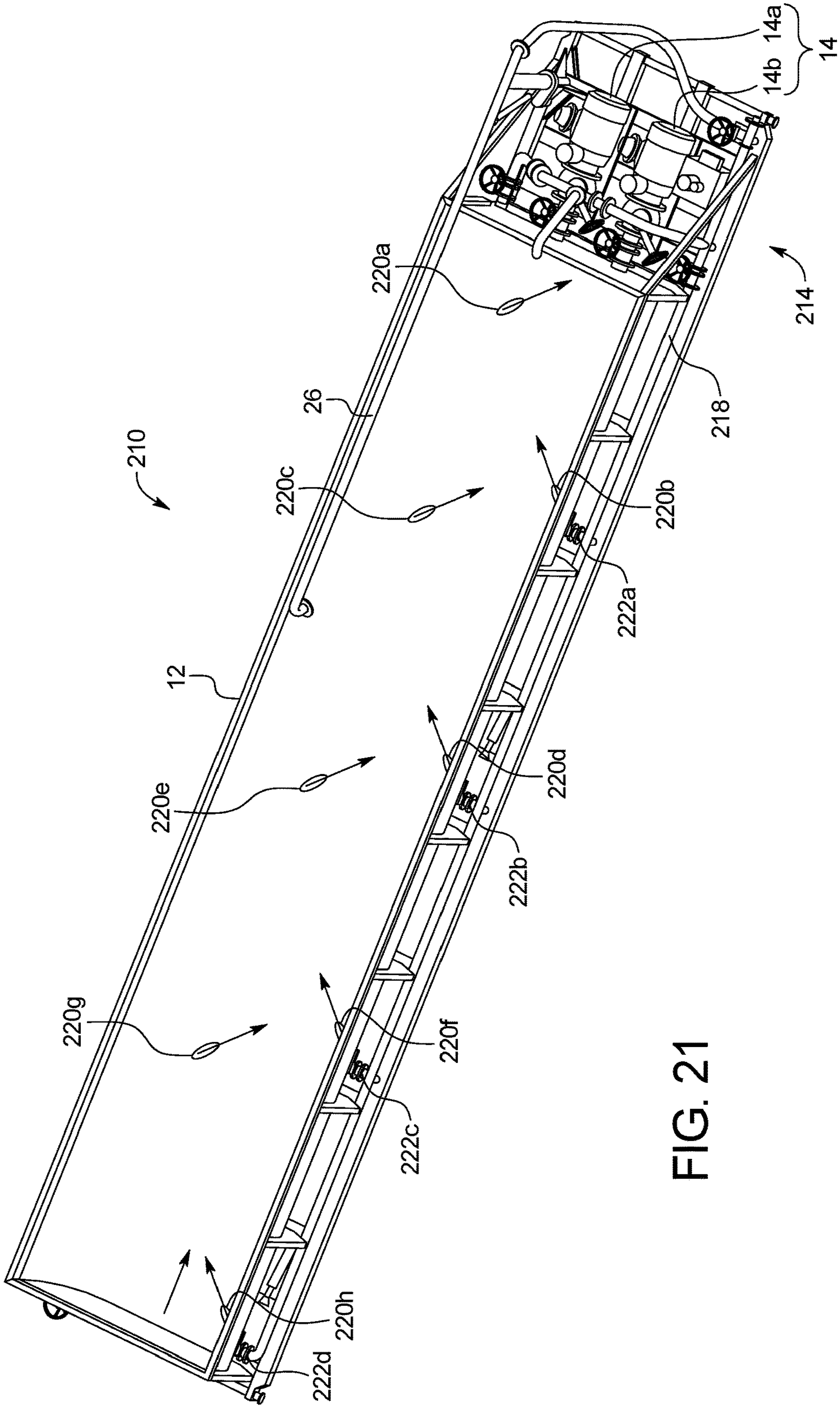
FIG. 21 is a top perspective view of another embodiment of a slurry removal system according the present invention.
Figure 23:
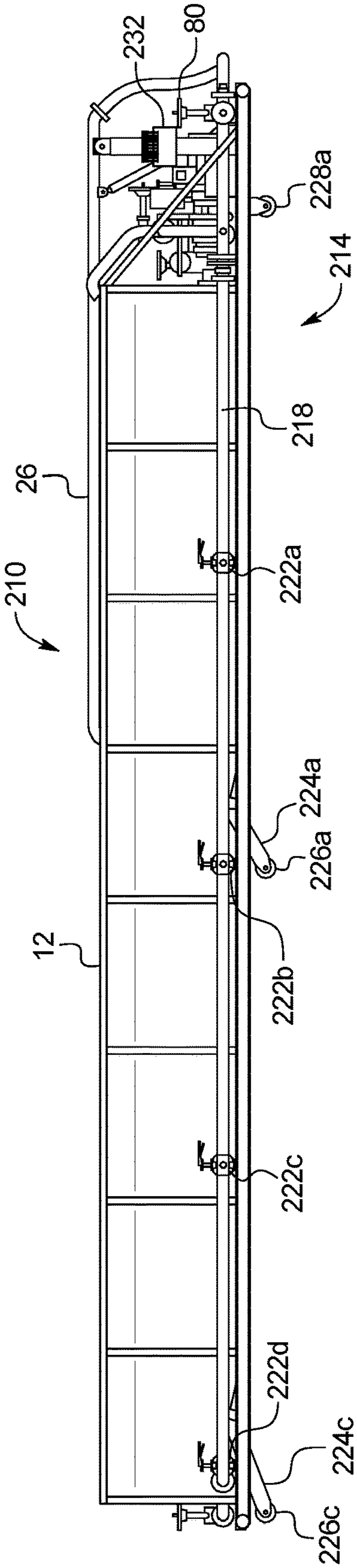
FIG. 23 is a side elevational view of the slurry removal system of FIG. 21.
Figure 24:
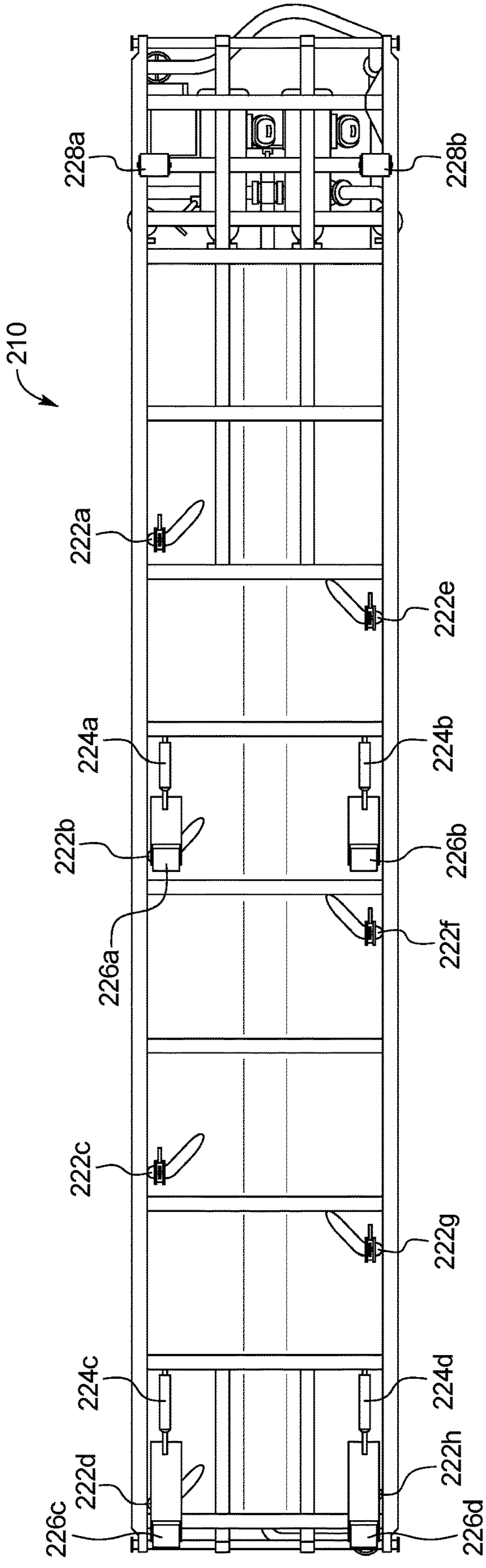
FIG. 24 is a bottom plan view of the slurry removal system of FIG. 21.

In this embodiment, as shown in FIGS. 21 and 23, the system 214 can include a jet system 216 that includes a pressure line 218, jets 220*a*-220*g* and valves 222*a*-222*d*. As can be understood, drill cuttings C are run through the shakers 16, which in turn deposit the slurry material M into the tank 12, generally along a side of the tank 12, along the length. However, it is noted that the material M can be deposited in any manner and in any position along the tank 12. As described herein, in one embodiment, the material M is drill fluid that is deposited in the tank 12, which can include both liquid and solid material, and once sufficient material M has accumulated such that the outlet of the tank 12 is covered, the pump system 14 can be primed and turned to an operating condition. The jets 220*a*-220*g* can be opened using valves 222*a*-222*g* such that the material M is moved toward the outlet.

Figure 22:
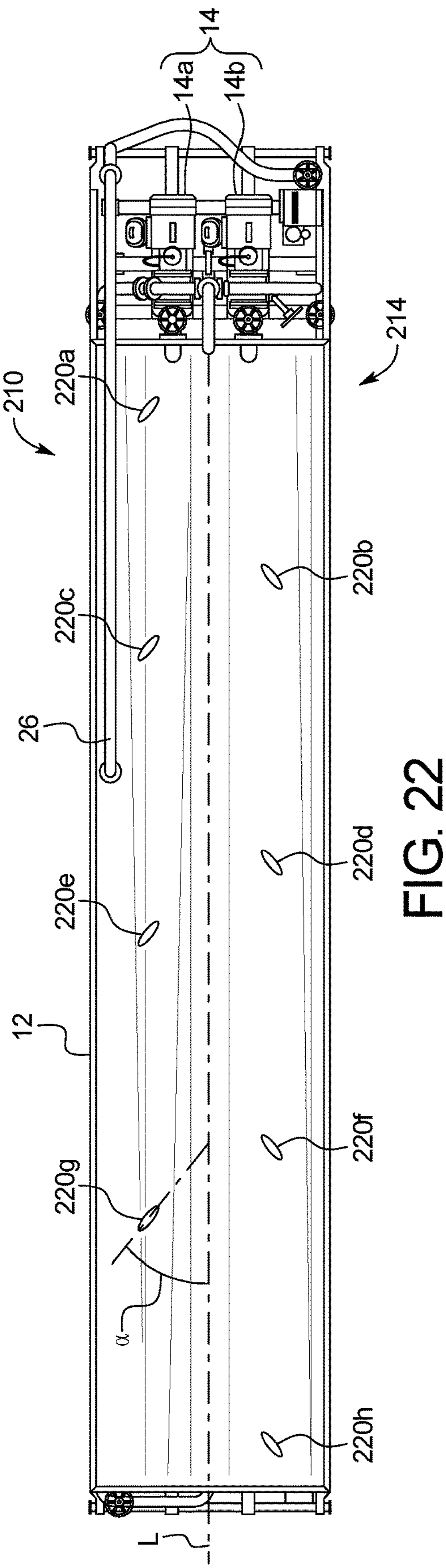
FIG. 22 is a top plan view of the slurry removal system of FIG. 21.
Figure 26:
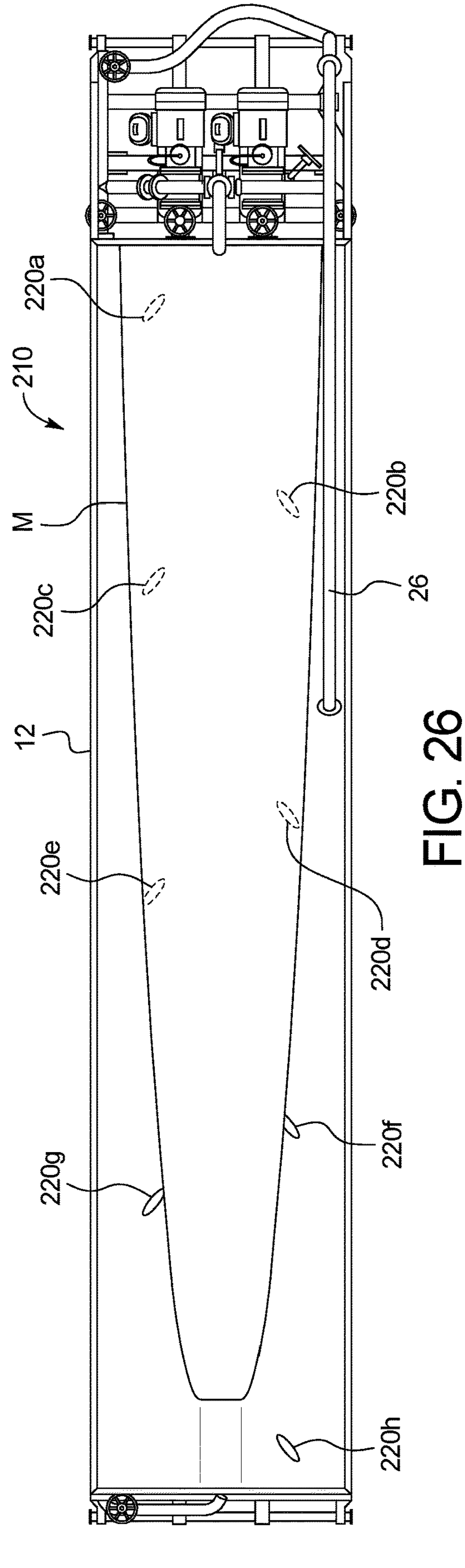
FIG. 26 is a top plan view of the slurry removal system of FIG. 21 with the tank angled up by the hydraulic lifts.

As illustrated in FIGS. 22 and 26 the jets 220*a*-220*g* can be four inch jets that are angled such that the jetted material M pushes the material M in the tank 12 in the direction of the outlet of the tank 12. In this embodiment, the jets 220*a*-220*g* can be angled at an angle $\alpha$ at about 45 degrees relative to the longitudinal center line L of the tank 12. However, it is noted that the jets 220*a*-220*g* can be angled at any angle desired. Angling the jets 220*a*-220*g* relative to the center line L enables the jets 220*a*-220*g* to facilitate movement of the material M in the direction of the outlet of the tank 12. This movement recirculates the solid material with liquid material to form a thick uniform mixture that can then be unloaded onto trucks though the unloading boom arm 26 or pumped to the reserve pit 22.

Figure 25:
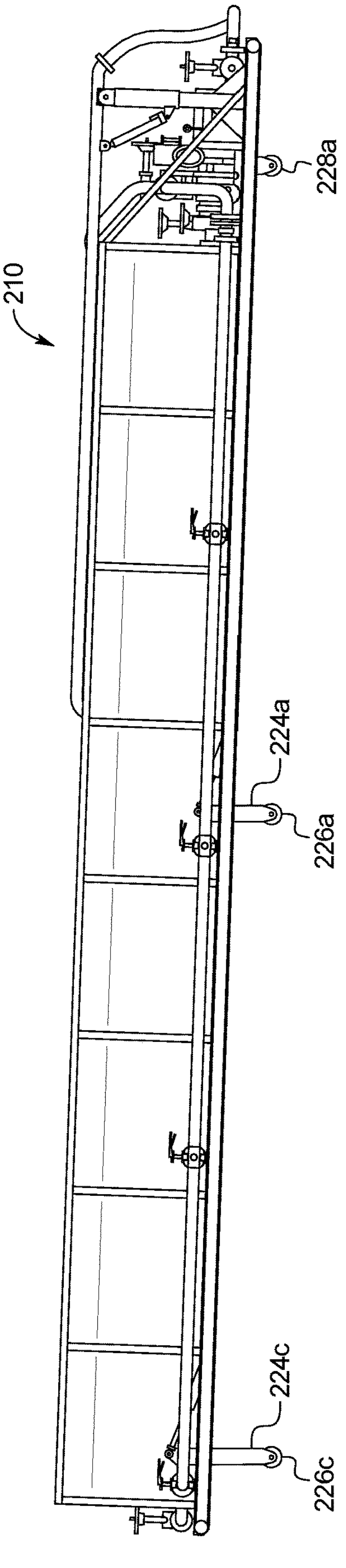
FIG. 25 is a side elevational view of the slurry removal system of FIG. 21 with the tank angled up by the hydraulic lifts.

Further, as illustrated in FIG. 23-26, the tank 12 can include hydraulic lifts 224*a*-224*d*. In one embodiment, the tank 12 includes four (4) hydraulic lifts along the length of the tank 12, with two hydraulic lifts 224*a* and 224*c* evenly spaced along the left side and two hydraulic lifts 224*b* and 224*d* evenly spaced along the right side. Accordingly, the tank 12 can be lifted or angled at one end. As shown in FIGS. 25 and 26, this angling enables the tank 12 to facilitate movement of the material M in the direction of the outlet of the tank. In one embodiment, the hydraulic lifts 224*a*-224*d* can include wheels 226*a*-226*d* and another set of wheels 228*a* and 228*b* can be disposed at end of the tank 12 that houses the pump system 214. Thus, the tank 12 can be moved along with wheels, if desired.

Figure 27:
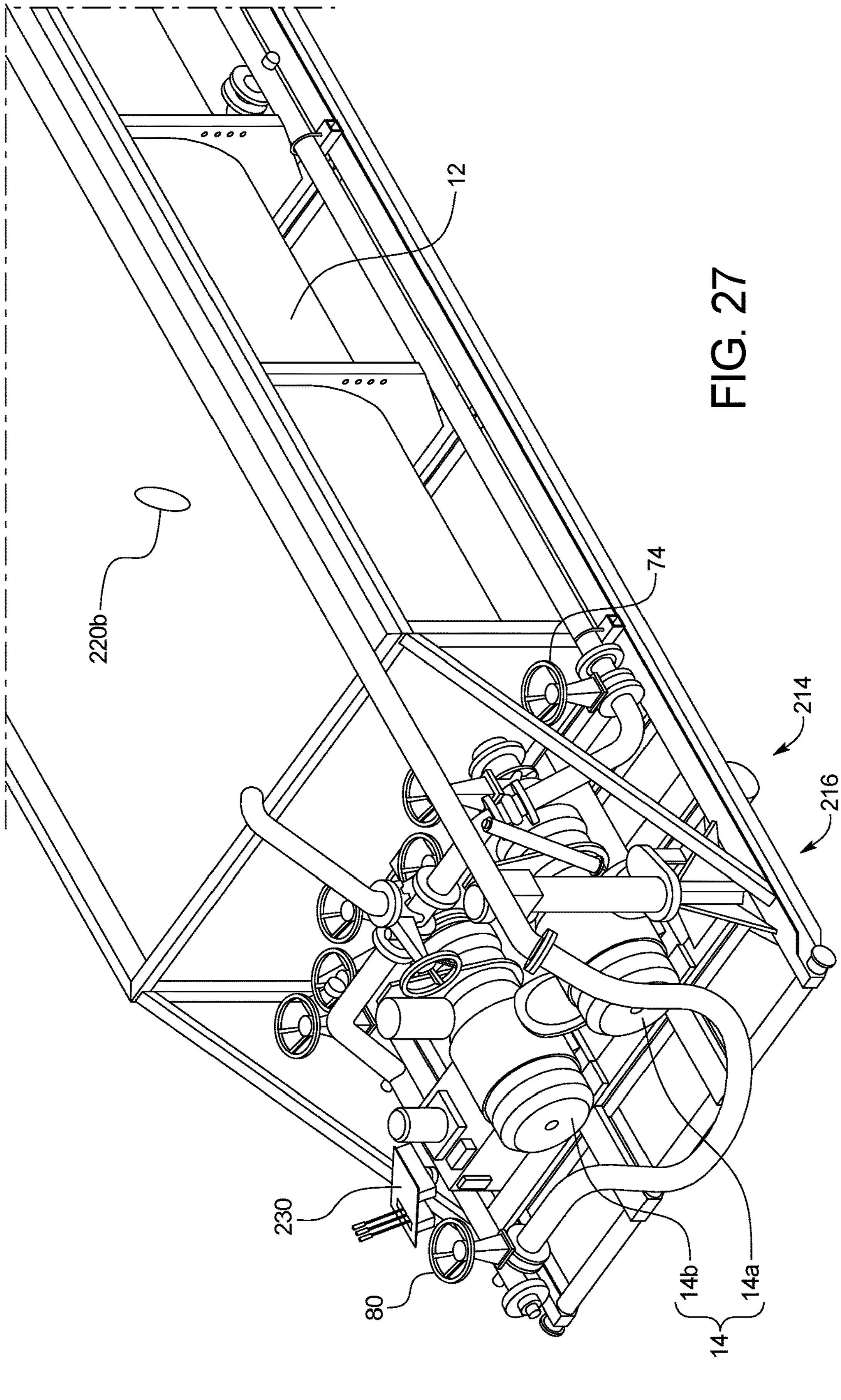
FIG. 27 is an enlarged view of the valve system of the slurry removal system of FIG. 21.
Figure 28:
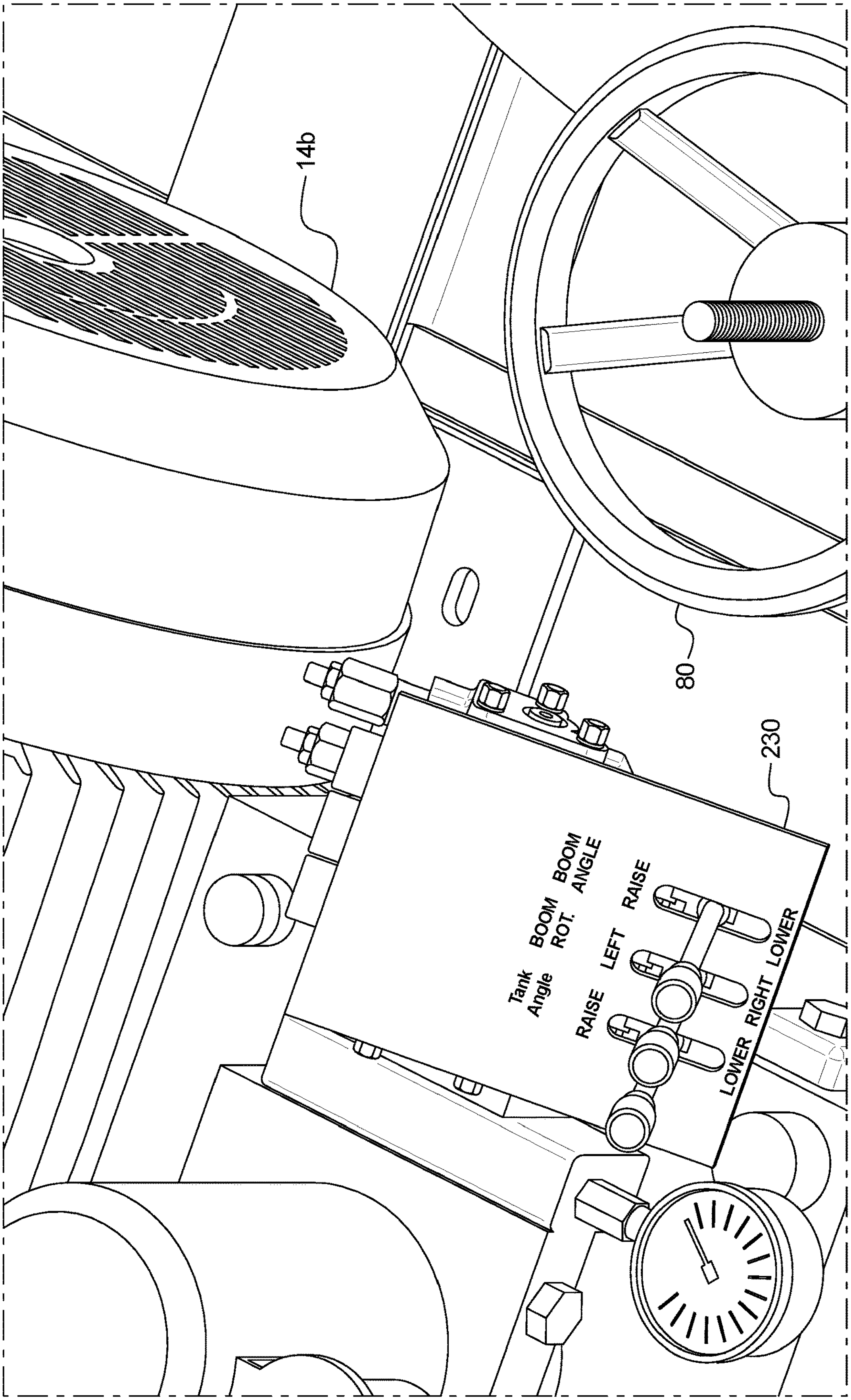
FIG. 28 is an enlarged view of the control panel for raising and lower the tank in the slurry removal system of FIG. 21.

FIG. 27 illustrates the manual valves (e.g., valves 74, 80, 86, 88, 124, 222*a*-222*d*) for operation of the pump system 214. In this embodiment an operator can manually open the valves 222*a*-222*g* to enable the operation of the jets 220*a*-220*g* and movement of the material M to the boom 26, to the reserve pit 22 and/or to be recirculated into the tank 12 through the pipe. Moreover, as illustrated in FIG. 28, the operator can operate the hydraulic system 216 through the use of the control panel 230. In one embodiment, the operator can control the tank angle, the boom arm rotation direction and the boom angle.

Figure 29:
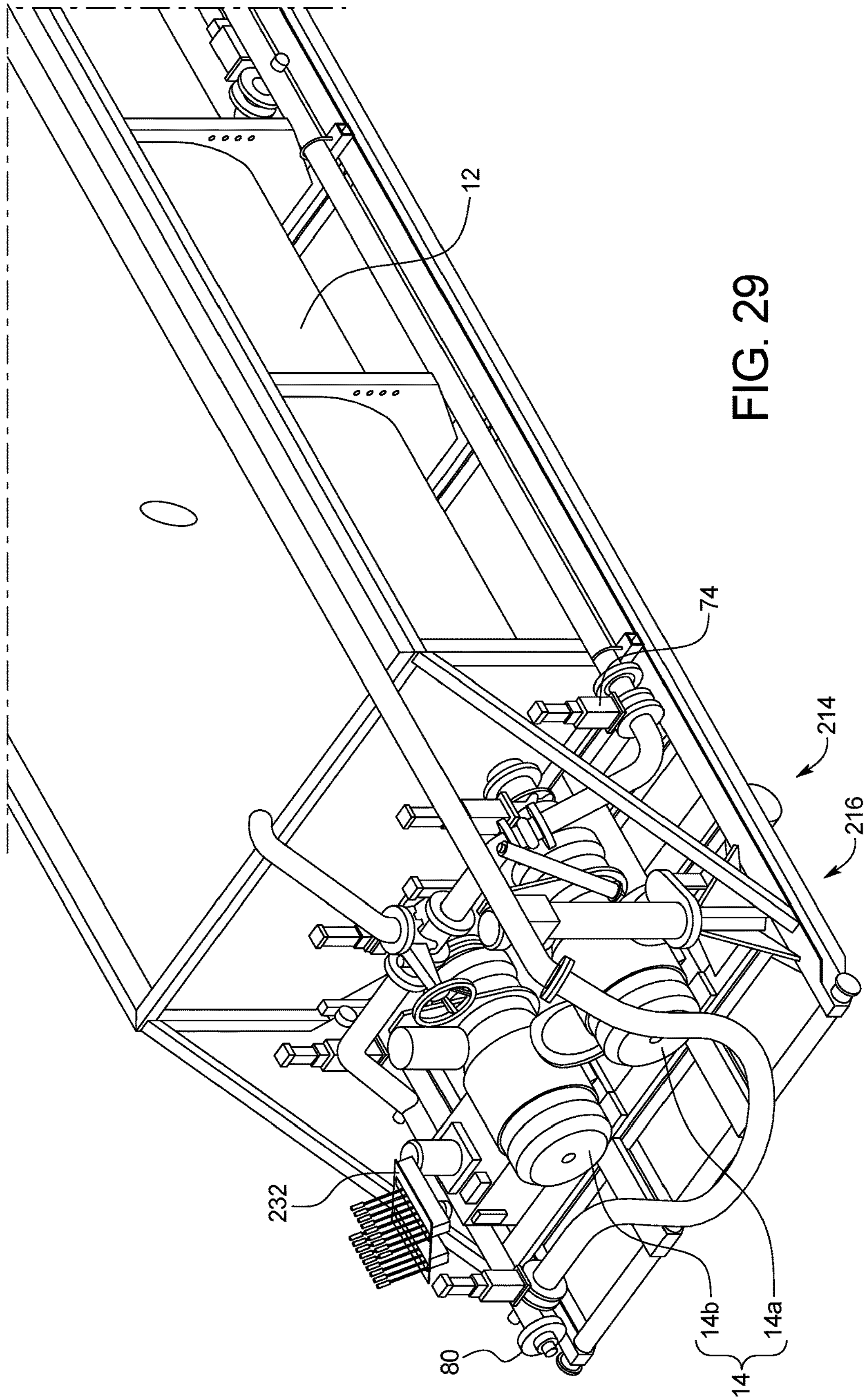
FIG. 29 is an enlarged view of the valve system of the slurry removal system of FIG. 21 with hydraulic valves.
Figure 30:
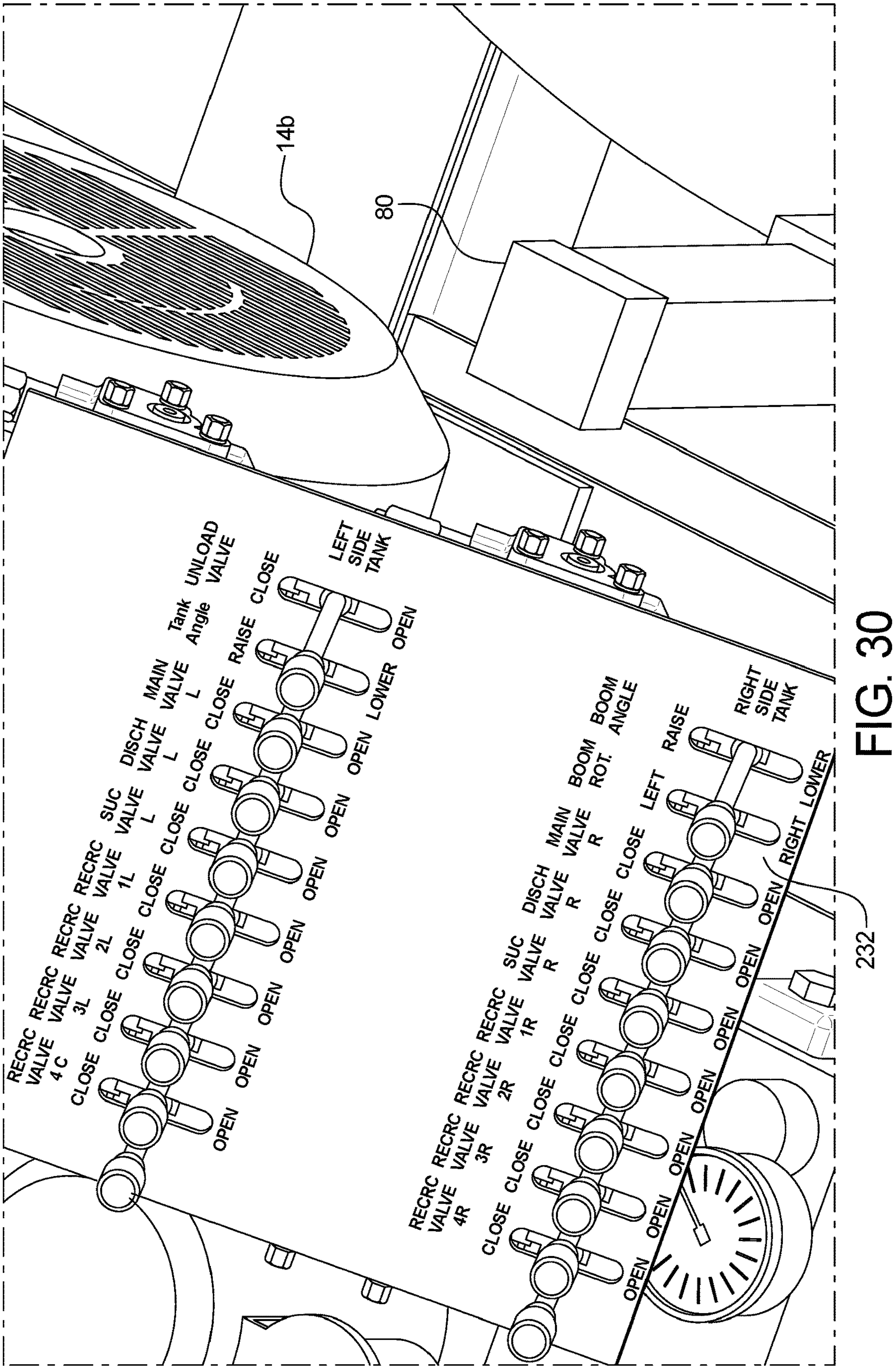
FIG. 30 is an enlarged view of the control panel for raising and lower the tank and operating the hydraulic jet valves in the slurry removal system of FIG. 29.

As illustrated in FIGS. 29-30, the valves 222*a*-222*g* can be automatic valves. In this embodiment, an operator can control the opening and closing of the valves 222*a*-222*g* and the jets through a control panel 232. Furthermore, as with the control panel 232 described above, the operator can control the tank 12 angle, the boom arm 26 rotation direction and the boom 26 angle with the control panel 232.

Thus, as can be understood, once the material M has been deposited into the tank, the operator can lift the end of the tank that is distal relative to the outlet of the tank using the control panel. The operator can then open the required valves (either manually or automatically through the control panel) to operate the jets and send the material M to the boom or to the reservoir pit. The operator can then operate the pump system to move the material M to the desired location.

The embodiments described herein can remove and/or store oil drillings in a safe, efficient and economic manner. Further, the use of the automated valve system can prevent or reduce clogging of the valves and enable an operator to operate the valves from a safe distance.

In understanding the scope of the present invention, the term “comprising” and its derivatives, as used herein, are intended to be open ended terms that specify the presence of the stated features, components, groups, integers, and/or steps, but do not exclude the presence of other unstated features, components, groups, integers and/or steps. The foregoing also applies to words having similar meanings such as the terms, “including”, “having” and their derivatives. Also, the terms “part,” “portion,” “member” or “element” when used in the singular can have the dual meaning of a single part or a plurality of parts.

The term “detect” as used herein to describe an operation or function carried out by a component, a section, a device or the like includes a component, a section, a device or the like that does not require physical detection, but rather includes determining, measuring, modeling, predicting or computing or the like to carry out the operation or function.

The term “configured” as used herein to describe a component, section or part of a device includes hardware and/or software that is constructed and/or programmed to carry out the desired function.

The terms of degree such as “about” and “approximately” as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A slurry removal system, comprising:

a tank configured to receive a mixture of solid material and liquid, the tank having a horizontal length extending from a first end to a second end opposite the first end;

a pump having a pump inlet connected to the tank and a pump outlet; and a pipe system connected to the pump outlet, the pipe system including a discharge line, a recirculation line, a pressurized line, and a connecting line, the discharge line configured to discharge the mixture of solid material and liquid from the tank into a truck or a reserve pit, the recirculation line having a recirculation inlet coupled to the tank proximal to the first end of the tank and a recirculation outlet coupled to the tank proximal to the second end of the tank, the pressurized line in fluid communication with the reserve pit, the connecting line connecting the pressurized line to the recirculation line at a location downstream of the recirculation inlet and upstream of the recirculation outlet, the pump configured to pump the mixture of solid material and liquid from the tank through the pump inlet to the recirculation line to form an essentially homogeneous mixture, and configured to pump the essentially homogeneous mixture from the tank through the pump inlet to the discharge line to remove the homogeneous mixture from the tank, and the pump configured to cause the material to pass through the recirculation line from the recirculation inlet to the recirculation outlet to facilitate creation of the essentially homogeneous mixture by causing the material to be moved through the horizontal length of the tank.

2. The slurry removal system according to claim 1, wherein the discharge line includes or is attached to an articulating boom arm.

3. The slurry removal system according to claim 1, wherein the pump inlet is connected to the first end of the tank and the recirculation line is connected to the pump inlet.

4. The slurry removal system according to claim 1, wherein the pipe system includes a flush line connecting the discharge line to the connecting line, and the pipe system includes a first valve configured to open and close the discharge line, a second valve configured to open and close the recirculation line, a third valve configured to open and close the connecting line, and a fourth valve configured to open and close the flush line.

5. The slurry removal system according to claim 4, further comprising a sensor configured to detect a level of material in the tank, and an electronic controller configured to (i) when the sensor detects the level of the material in the tank having reached a first level, cause the first valve, the third valve and the fourth valve to be closed so that the material in the tank is recirculated through the recirculation line and back into the tank, and (ii) when the sensor detects the level of the material in the tank having reached a second level greater than the first level, cause the first valve to be opened and the second valve to be closed so that the material in the tank is discharged through the discharge line.

6. The slurry removal system according to claim 4, further comprising a sensor configured to detect a level of material in the tank, and an electronic controller configured to (i) when the sensor detects the level of the material in the tank having reached a first level, cause the first valve, the third valve and the fourth valve to be closed so that the material in the tank is recirculated through the recirculation line and back into the tank, (ii) when the sensor detects the level of the material in the tank having reached a second level greater than the first level, cause the first valve to be opened and the second valve to be closed so that the material in the tank is discharged through the discharge line, and (iii) after causing the material in the tank to be discharged through the discharge line, causing the third valve to open so that water flows through the flush line and the recirculation line.

7. The slurry removal system according to claim 1, further comprising a centrifuge configured to mix the mixture of solid material and liquid, the centrifuge located along the pressurized line.

8. The slurry removal system according to claim 1, further comprising shakers configured to deposit the solid material from a drilling device into the tank.

9. The slurry removal system according to claim 1, further comprising water gun jets configured to break up the solid material, the water gun jets located along the pressurized line.

10. The slurry removal system according to claim 1, wherein the pump is a first pump and the slurry removal system includes a second pump.

11. The slurry removal system according to claim 1, further comprising a sensor configured to detect a level of material in the tank, and an electronic controller configured to (i) when the sensor detects the level of the material in the tank having reached a first level, cause the material in the tank to be recirculated through the recirculation line and back into the tank, and (ii) when the sensor detects the level of the material in the tank having reached a second level greater than the first level, cause the material in the tank to be discharged through the discharge line.

12. A method of removing slurry, the method comprising:

depositing a mixture of solid material and liquid into a tank having a horizontal length extending from a first end to a second end opposite the first end; and pumping the mixture of solid material and liquid with a pump having a pump inlet connected to the tank and a pump outlet through a pipe system connected to the pump outlet and including a discharge line, a recirculation line, and a flush line, the discharge line configured to discharge the mixture of solid material and liquid from the tank into a truck or a reserve pit, the recirculation line having a recirculation inlet coupled to the tank proximal to the first end of the tank and a recirculation outlet coupled to the tank proximal to the second end of the tank, the flush line being in fluid communication with the discharge line and the recirculation line, the pumping the mixture of solid material and liquid with the pump through the pipe system including when the mixture of solid material in the tank reaches a first level, pumping the mixture of solid material and liquid from the tank through the pump inlet to the recirculation line such that the material passes through the recirculation line from the recirculation inlet to the recirculation outlet and moves through the horizontal length of the tank to form an essentially homogeneous mixture with the recirculation line in an open state, when the mixture of solid material in the tank reaches a second level greater than the first level, closing the recirculation line and pumping the essentially homogeneous mixture from the tank through the pump inlet to the discharge line to remove the homogeneous mixture from the tank into the truck or the reserve pit with the discharge line is in an open state, and after pumping the essentially homogeneous mixture into the truck or the reserve pit, placing the recirculation line back in the open state and pumping water from the flush line and through the recirculation line.

13. The method according to claim 12, wherein the discharge line includes a first valve configured to open and close the discharge line and the recirculation line includes a second valve configured to open and close the recirculation line.

14. The method according to claim 12, wherein the pump inlet is connected the first end of the tank and the recirculation line is connected to the pump inlet.

15. The method according to claim 12, further comprising mixing the mixture of solid material and liquid with a centrifuge located along a pressurized line that is in fluid communication with the reserve pit.

16. The method according to claim 12, wherein the depositing the mixture of solid material and liquid into the tank includes depositing the mixture of solid material and liquid with a plurality of shakers.

17. The method according to claim 12, further comprising breaking up the solid material with water gun jets located along a pressurized line that is in fluid communication with the reserve pit.

18. The method according to claim 12, wherein the pump is a first pump and the pumping the mixture of solid material and liquid includes pumping the mixture of solid material and liquid with a second pump.

19. The method according to claim 12, wherein the pipe system further includes a pressurized line and a connecting line, the pressurized line in fluid communication with the reserve pit, the connecting line connecting the pressurized line to the recirculation line at a location downstream of the recirculation inlet and upstream of the recirculation outlet, and wherein pumping water from the flush line and through the recirculation line includes pumping the water through the connecting line.

20. The method according to claim 12, comprising detecting the first level and the second level with a sensor, automatically pumping the mixture of solid material and liquid from the tank through the pump inlet to the recirculation line upon detecting the first level, and automatically closing the recirculation line and pumping the essentially homogeneous mixture from the tank through the pump inlet to the discharge line upon detecting the second level.

* * * * *